US012560726B2

(12) United States Patent
Huang et al.

(10) Patent No.: US 12,560,726 B2
(45) Date of Patent: Feb. 24, 2026

(54) LOW-POWER-CONSUMPTION POSITIONING METHOD AND RELATED APPARATUS

(71) Applicant: Huawei Technologies Co., Ltd., Shenzhen (CN)

(72) Inventors: Guosheng Huang, Shanghai (CN); Zhenhua Chen, Shanghai (CN); Chunzi Liu, Dongguan (CN); Yongxiang Liu, Shanghai (CN); Yongfeng Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 462 days.

(21) Appl. No.: 18/042,086

(22) PCT Filed: Aug. 17, 2021

(86) PCT No.: PCT/CN2021/113000

§ 371 (c)(1),
(2) Date: Feb. 17, 2023

(87) PCT Pub. No.: WO2022/037575

PCT Pub. Date: Feb. 24, 2022

(65) Prior Publication Data

US 2023/0243982 A1 Aug. 3, 2023

(30) Foreign Application Priority Data

Aug. 21, 2020 (CN) .......................... 202010851720.4

(51) Int. Cl.
*G01S 19/48* (2010.01)
*G01S 19/25* (2010.01)
*H04W 64/00* (2009.01)

(52) U.S. Cl.
CPC ............ *G01S 19/48* (2013.01); *G01S 19/256* (2013.01); *H04W 64/00* (2013.01)

(58) Field of Classification Search
CPC ........ G01S 19/48; G01S 19/256; G01S 19/14; G01S 19/421; G01S 5/011; G01S 5/015;
(Continued)

(56) References Cited

U.S. PATENT DOCUMENTS

| | | | | |
|---|---|---|---|---|
| 2017/0055174 A1* | 2/2017 | Siomina | ................ | H04W 24/08 |
| 2017/0208563 A1* | 7/2017 | Fischer | ................ | H04W 16/32 |
| 2020/0053686 A1* | 2/2020 | Edge | ................ | H04W 52/0229 |

FOREIGN PATENT DOCUMENTS

| | | | | | |
|---|---|---|---|---|---|
| CN | 107229061 A | * | 10/2017 | ............. | G01S 19/41 |
| CN | 105184776 B | * | 9/2018 | ............. | G01S 19/42 |

(Continued)

*Primary Examiner* — Qun Shen
(74) *Attorney, Agent, or Firm* — Conley Rose, P.C.

(57) ABSTRACT

A low-power-consumption positioning method includes an electronic device sending first setting information to a server, where the first setting information is used to indicate the server to broadcast positioning assistance data to the electronic device at a first time interval (for example, 1 second). The electronic device resolves high-precision positioning information based on the positioning assistance data. When the electronic device meets a first preset condition, the electronic device may send second setting information to the server. The second setting information instructs the server to broadcast the positioning assistance data to the electronic device at a second time interval (for example, 60 seconds). The first time interval is shorter than the second time interval.

20 Claims, 25 Drawing Sheets

(58) Field of Classification Search
CPC .......... G01S 19/05; G01S 19/34; G01S 5/009;
G01S 19/43; G01S 19/423; H04W 64/00;
H04W 4/023; H04W 52/027; H04W
52/028; H04W 4/33; H04W 52/0248;
Y02D 30/70
See application file for complete search history.

(56) References Cited

FOREIGN PATENT DOCUMENTS

| | | | | |
|----|----|----|----|----|
| CN | 108490464 A | 9/2018 | | |
| CN | 109496275 A | 3/2019 | | |
| CN | 110636558 A | 12/2019 | | |
| CN | 111045043 A | 4/2020 | | |
| WO | WO-2015147150 A1 * | 10/2015 | ........... | A01B 69/008 |
| WO | WO-2015147224 A1 * | 10/2015 | ........... | G01S 13/931 |
| WO | WO-2015178448 A1 * | 11/2015 | ............... | B62D 1/28 |
| WO | WO-2016017367 A1 * | 2/2016 | ............... | H04Q 9/00 |
| WO | 2017208613 A1 | 12/2017 | | |
| WO | WO-2020105689 A1 * | 5/2020 | ........... | G01S 19/073 |

* cited by examiner

Positioning system 10

FIG. 9B

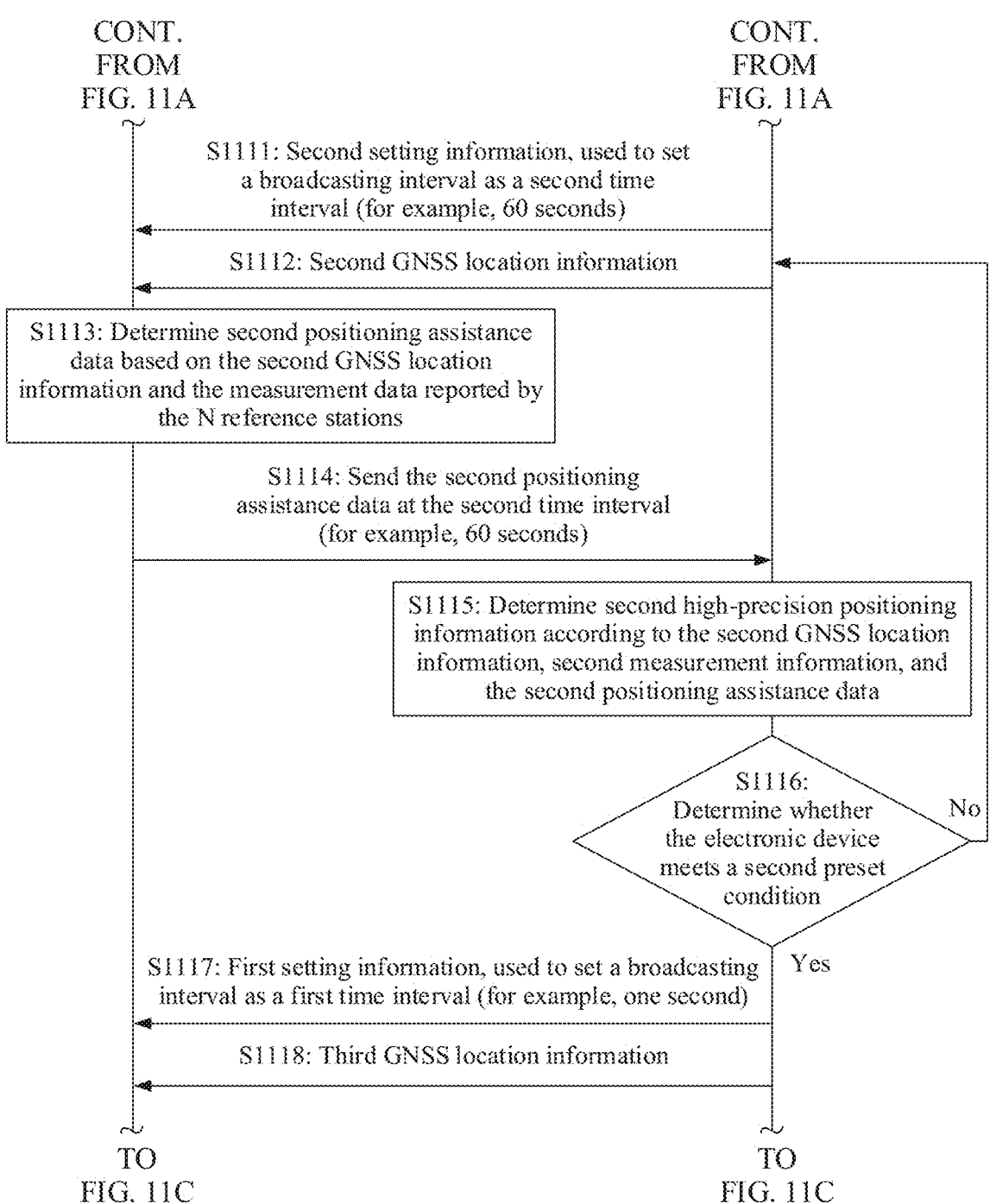

CONT.
FROM
FIG. 11A

CONT.
FROM
FIG. 11A

S1111: Second setting information, used to set
a broadcasting interval as a second time
interval (for example, 60 seconds)

S1112: Second GNSS location information

S1113: Determine second positioning assistance
data based on the second GNSS location
information and the measurement data reported by
the N reference stations S1114: Send the second positioning
assistance data at the second time interval
(for example, 60 seconds)

S1115: Determine second high-precision positioning
information according to the second GNSS location
information, second measurement information, and
the second positioning assistance data S1116:
Determine whether
the electronic device
meets a second preset
condition No Yes S1117: First setting information, used to set a broadcasting
interval as a first time interval (for example, one second)

S1118: Third GNSS location information

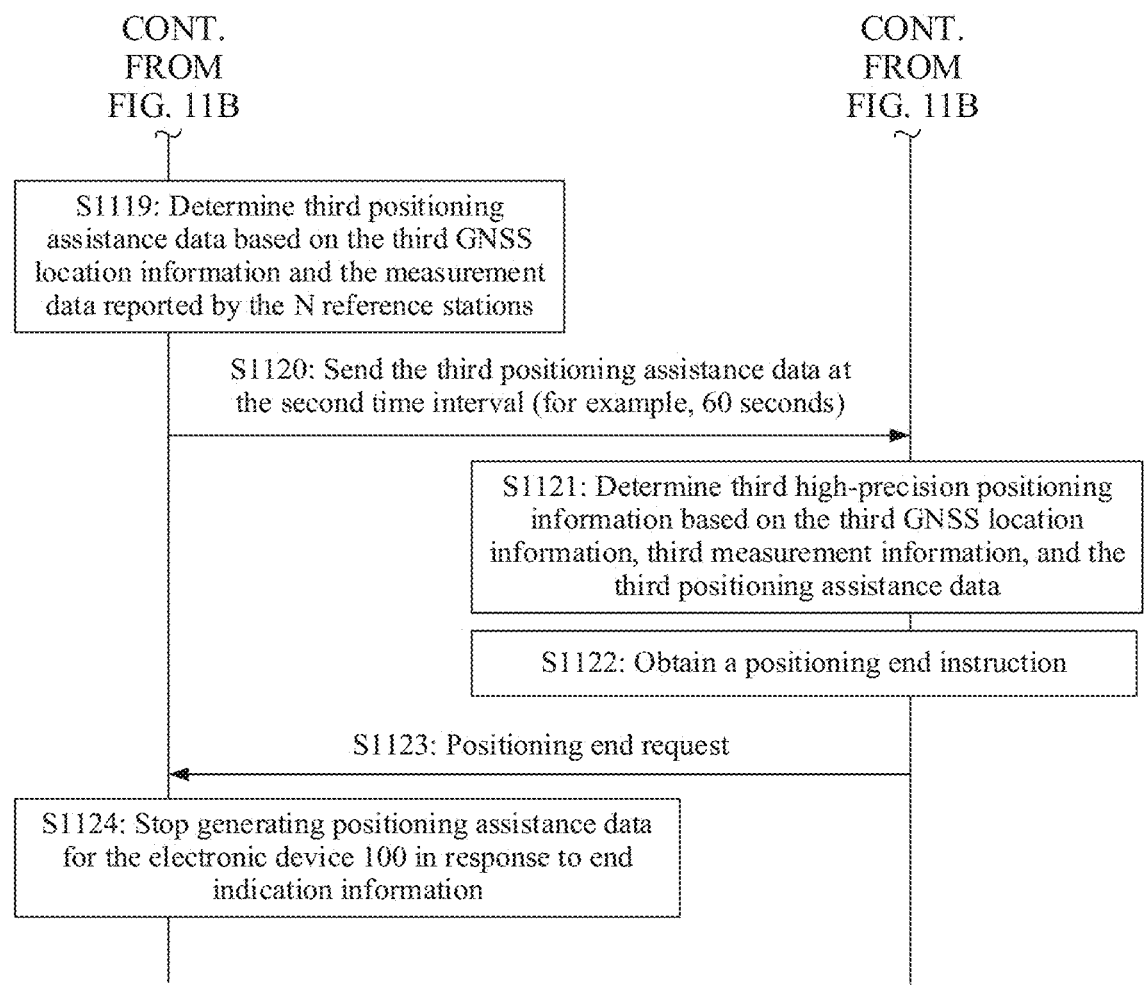

CONT.
FROM
FIG. 11B

CONT.
FROM
FIG. 11B

S1119: Determine third positioning
assistance data based on the third GNSS
location information and the measurement
data reported by the N reference stations S1120: Send the third positioning assistance data at
the second time interval (for example, 60 seconds)

S1121: Determine third high-precision positioning
information based on the third GNSS location
information, third measurement information, and the
third positioning assistance data S1122: Obtain a positioning end instruction S1123: Positioning end request S1124: Stop generating positioning assistance data
for the electronic device 100 in response to end
indication information

FIG. 11C

LOW-POWER-CONSUMPTION POSITIONING METHOD AND RELATED APPARATUS

RELATED APPARATUS

This is a National Stage of International Patent Application No. PCT/CN2021/113000 filed on Aug. 17, 2021, which claims priority to Chinese Patent Application No. 202010851720.4 filed on Aug. 21, 2020. Both of the aforementioned applications are hereby incorporated by reference in their entireties.

TECHNICAL FIELD

This application relates to the field of positioning technologies, and in particular, to a low-power-consumption positioning method and a related apparatus.

BACKGROUND

In electronic devices represented by smartphones, location based service (location based service, LBS) has become an essential basic service to obtain accurate user location.

At present, electronic devices such as smartphones all use a global navigation satellite system (global navigation satellite system, GNSS) positioning technology, for example, single-point positioning based on pseudo-range ranging, and precision can generally reach a meter level (for example, 3 to 5 m), to meet a basic positioning and navigation requirement. To further improve GNSS positioning accuracy, auxiliary data for correcting a GNSS ephemeris error, an atmospheric error, and the like needs to be introduced from a third-party reference station. For example, differential global navigation satellite system (differential navigation satellite system, DGNSS) and real-time dynamic (real-time kinematic, RTK) based on differential positioning, and precise single point positioning (precise point positioning, PPP) based on error correction are introduced. Both the RTK technology and the PPP technology use a carrier phase to perform ranging, and positioning precision can reach a submeter (<1 m) level to a centimeter level, so that lane information of a vehicle can be accurately identified, thereby meeting a requirement of lane-level navigation.

Using the UK technology as an example, to implement a dynamic real-time positioning requirement, an electronic device needs to download differential auxiliary data from a server in real time, and quickly solve an integral cycle ambiguity of a carrier phase to complete high-precision solving. When the RTK technology is used in fields such as precision agriculture, geodetic survey, and engineering mapping, because these fields have high requirements on positioning precision and stability, power consumption is relatively less considered. However, for a consumer electronic product such as a smartphone, real-time data downloading requires that a baseband chip to be always in a working state, which leads to a significant increase in overall power consumption.

SUMMARY

This application provides a low-power-consumption positioning method and a related apparatus, so as to prolong a request interval of assistance data as much as possible while ensuring high-precision positioning performance, thereby reducing power consumption of an electronic device.

According to a first aspect, this application provides a low-power-consumption positioning method, including: An electronic device receives a first input. The electronic device sends first setting information to a server in response to the first input, where the first setting information is used to set a time interval at which the server broadcasts positioning assistance data as a first time interval. The electronic device sends first GNSS location information to the server. The electronic device receives first positioning assistance data that is broadcast by the server at the first time interval and that is determined based on the first GNSS location information and measurement data reported by N reference stations, where N is a positive integer. The electronic device resolves first high-precision positioning information based on the first GNSS location information and the first positioning assistance data. When the electronic device detects that the electronic device meets a first preset condition, the electronic device sends second setting information to the server, where the second setting information is used to set a time interval at which the server broadcasts positioning assistance data as a second time interval, and the second time interval is longer than the first time interval. The electronic device, sends second GNSS location information to the server. The electronic device receives second positioning assistance data that is broadcast by the server at the second time interval and that is determined based on the second GNSS location information and measurement data reported by the N reference stations. The electronic device resolves second high-precision positioning information based on the second GNSS location information and the second positioning assistance data.

The first preset condition includes: Positioning precision of the electronic device is less than a first preset precision threshold, and lower positioning precision indicates more accurate positioning of the electronic device.

According to the low-power-consumption positioning method provided in this application, when an electronic device completes common positioning by using a GNSS chip for the first time and obtains GNSS location information, the electronic device may enter an extreme performance mode, and send first setting information to a server, where the first setting information is used to indicate the server to broadcast positioning assistance data to the electronic device at a first time interval (for example, one second). When the high-precision positioning succeeds and the positioning precision is lower than the first preset precision (lower positioning precision indicates a more accurate positioning result), the electronic device may enter a normal mode, and send second setting information to the server, where the second setting information is used to indicate the server to broadcast the positioning assistance data to the electronic device at a second time interval (for example, 60 seconds). The first time interval is shorter than the second time interval. In this way, the electronic device can prolong an interval for requesting the positioning assistance data as much as possible while ensuring high-precision positioning performance, thereby reducing power consumption of the electronic device.

In a possible implementation, after the electronic device sends the second setting information to the server, when the electronic device detects that the electronic device meets a second preset condition, the electronic device sends the first setting information to the server. The electronic device sends third GNSS location information to the server. The electronic device receives third positioning assistance data that is broadcast by the server at the first time interval and that is determined based on the third GNSS location information and measurement data reported by the N reference stations. The electronic device resolves third high-precision positioning information based on the third GNSS location information and the third positioning assistance data.

The second preset condition includes any one of the following: The electronic device is in a multipath area a moving speed of the electronic device is greater than a preset speed threshold, or positioning precision of the electronic device is greater than a second preset precision threshold. When the electronic device detects that a quantity of satellites whose signal intensity is greater than a third signal intensity threshold is less than a first quantity and greater than a second quantity, the electronic device determines that the electronic device is in a multipath area, where the first quantity is greater than the second quantity.

In this way, when the electronic device enters a multipath area, or a moving speed of the electronic device is greater than a preset speed threshold (for example, 80 km/h), or positioning precision of the electronic device is greater than a second preset precision threshold, the electronic device may reduce an interval at which the server broadcasts positioning assistance data, thereby improving positioning accuracy.

In a possible implementation, after the electronic device sends the first setting information to the server, when the electronic device meets a third preset condition, the electronic device sends third setting information to the server, where the third setting information is used to request the server to suspend broadcasting the positioning assistance data.

The third preset condition includes a case in which the electronic device is located indoors or in a tunnel. When the electronic device detects that the quantity of satellites whose signal intensity is greater than a first signal intensity threshold is less than or equal to a first threshold for a preset time, the electronic device determines that the electronic device is located indoors or in a tunnel.

In this way, when the electronic device enters a special scenario (for example, entering a tunnel, being indoors, or not in a service area of a reference station), the electronic device may enter a suspending mode, and send the third setting information to the server, where the third setting information is used to indicate the server to suspend broadcasting the positioning assistance data to the electronic device. In this way, when the electronic device cannot obtain the high-precision location information in the special scenario, the server may be enabled to suspend broadcasting the positioning assistance data, and the electronic device suspends requesting and receiving the positioning assistance data. In this way, power consumption of the electronic device can be reduced.

In a possible implementation, after the electronic device sends the third setting information to the server, when the electronic device meets a fourth preset condition, the electronic device sends the first setting information to the server. The electronic device sends fourth GNSS location information to the server. The electronic device receives fourth positioning assistance data that is broadcast by the server at the first time interval and that is determined based on the fourth GNSS location information and the measurement data that is reported by the N reference stations. The electronic device resolves fourth high-precision positioning information based on the fourth GNSS location information and the fourth positioning assistance data.

The fourth preset condition includes a case in which the electronic device is located outdoors or outside a tunnel, and the electronic device is located in an area in which the N reference stations are located. When the electronic device detects that the quantity of satellites whose signal intensity is greater than the first signal intensity threshold is greater than a second threshold. The electronic device determines that the electronic device is located outdoors or outside a tunnel.

In this way, when the electronic device exits the special scenario (for example, leaving a tunnel, going outdoors, or re-entering a service area of a reference station), the electronic device may enter an extreme performance mode, and send the first setting information to the server, where the first setting information is used to indicate the server to broadcast the positioning assistance data to the electronic device at the first time interval (for example, one second). In this way, the electronic device may quickly obtain the high-precision location information when exiting the special scenario.

In a possible implementation, the electronic device sends a high-precision positioning request to the server in response to the first input, where the high-precision positioning request includes authentication information. The electronic device receives authentication success information sent by the server, where the authentication success information is used to indicate that the electronic device has completed authentication. The electronic device sends the first setting information to the server in response to the authentication success information.

According to a second aspect, this application provides a positioning system, including an electronic device and a server, where the electronic device is configured to receive a first input. The electronic device is further configured to send first setting information to the server in response to the first input, where the first setting information is used to set a time interval at which the server broadcasts positioning assistance data as a first time interval. The electronic device is further configured to send first GNSS location information to the server. The server is configured to determine first positioning assistance data based on the first GNSS location information and measurement data reported by N reference stations, where N is a positive integer. The server is further configured to broadcast the first positioning assistance data to the electronic device at the first time interval. The electronic device is further configured to resolve first high-precision positioning information based on the first GNSS location information and the first positioning assistance data. The electronic device is further configured to: when the electronic device detects that the electronic device meets a first preset condition, the electronic device sends second setting information to the server, where the second setting information is used to set a time interval at which the server broadcasts positioning assistance data as a second time interval, and the second time interval is longer than the first time interval. The electronic device is further configured to send second GNSS location information to the server. The server is further configured to determine second positioning assistance data based on the second GNSS location information and measurement data reported by the N reference stations. The server is further configured to broadcast the second positioning assistance data to the electronic device at a second time interval. The electronic device is further configured to resolve second high-precision positioning information based on the second GNSS location information and the second positioning assistance data.

The first preset condition includes: Positioning precision of the electronic device is less than a first preset precision threshold, and lower positioning precision indicates more accurate positioning of the electronic device.

In a possible implementation, the electronic device is further configured to: after sending the second setting information to the server, when the electronic device detects that the electronic device meets a second preset condition, the electronic device sends the first setting information to the server. The electronic device is further configured to send third GNSS location information to the server. The server is further configured to determine third positioning assistance data based on the third GNSS location information and the measurement data reported by the N reference stations. The server is further configured to broadcast the third positioning assistance data to the electronic device at the first time interval.

The second preset condition includes any one of the following: The electronic device is in a multipath area, a moving speed of the electronic device is greater than a preset speed threshold, or positioning precision of the electronic device is greater than a second preset precision threshold. When the electronic device detects that a quantity of satellites whose signal intensity is greater than a third signal intensity threshold is less than a first quantity and greater than a second quantity, the electronic device determines that the electronic device is in a multipath area, where the first quantity is greater than the second quantity.

In a possible implementation, the electronic device is further configured to: after sending the first setting information to the server, when the electronic device meets a third preset condition, send third setting information to the server, where the third setting information is used to request the server to suspend broadcasting the positioning assistance data. The server is further configured to suspend broadcasting the first positioning assistance data or the second positioning assistance data to the electronic device in response to the third setting information.

The third preset condition includes a case in which the electronic device is located indoors or in a tunnel. When the electronic device detects that the quantity of satellites whose signal intensity is greater than a first signal intensity threshold is less than or equal to a first threshold for a preset time, the electronic device determines that the electronic device is located indoors or in a tunnel.

In a possible implementation, the electronic device is further configured to: after sending the third setting information to the server, when the electronic device meets a fourth preset condition, send the first setting information to the server. The electronic device is further configured to send fourth GNSS location information to the server. The server is further configured to determine fourth positioning assistance data based on the fourth GNSS location information and the measurement data reported by the N reference stations. The server is further configured to broadcast the fourth GNSS location information to the electronic device at the first time interval. The electronic device is further configured to resolve fourth high-precision positioning information based on the fourth GNSS location information and the fourth positioning assistance data.

The fourth preset condition includes a case in which the electronic device is located outdoors or outside a tunnel, and the electronic device is located in an area in which the N reference stations are located. When the electronic device detects that a quantity of satellites whose signal intensity is greater than a first signal strength threshold is greater than a second threshold, the electronic device determines that the electronic device is located outdoors or outside a tunnel.

In a possible implementation, the electronic device is specifically configured to: send a high-precision positioning request to the server in response to the first input, where the high-precision positioning request includes authentication information; receive authentication success information sent by the server, where the authentication success information is used to indicate that the electronic device has completed authentication; and send the first setting information to the server in response to the authentication success information.

According to a third aspect, this application provides another low-power-consumption positioning method, including: An electronic device sends first setting information to a server. The electronic device receives positioning assistance data broadcast by the server at a first time interval in response to the first setting information. When the electronic device detects that the quantity of satellites whose signal intensity is greater than a first signal intensity threshold is less than or equal to a first threshold for a preset time, the electronic device sends third setting information to the server, where the third setting information is used to indicate the server to stop broadcasting the positioning assistance data. The electronic device stops receiving the positioning assistance data broadcast by the server.

According to the low-power-consumption positioning method provided in this application, when the electronic device enters a special scenario (for example, entering a tunnel, being indoors, or not in a service area in which a reference station is located), the electronic device may enter a suspending mode, and send the third setting information to the server. The third setting information is used to indicate the server to suspend broadcasting the positioning assistance data to the electronic device. In this way, when the electronic device cannot obtain high-precision location information in the special scenario, the server may be enabled to suspend broadcasting the positioning assistance data, and the electronic device suspends requesting and receiving the positioning assistance data. In this way, power consumption of the electronic device can be reduced.

In a possible implementation, after the electronic device receives the first positioning assistance data broadcast by the server at the first time interval in response to the first setting information, when the electronic device detects that the electronic device meets a first preset condition, the electronic device sends second setting information to the server, where the first preset condition includes a case in which positioning precision of the electronic device is less than a first preset precision threshold, and lower positioning precision indicates more accurate positioning of the electronic device. The electronic device receives the positioning assistance data broadcast by the server at a second time interval in response to the second setting information, where the second time interval is longer than the first time interval.

When high-precision positioning succeeds and the positioning precision is lower than first preset precision (lower positioning precision indicates a more accurate positioning result), the electronic device may enter a normal mode, and send the second setting information to the server, where the second setting information is used to indicate the server to broadcast the positioning assistance data to the electronic device at the second time interval (for example, 60 seconds). The first time interval is shorter than the second time interval. In this way, the electronic device can prolong an interval for requesting the positioning assistance data as much as possible while ensuring high-precision positioning performance, thereby reducing power consumption of the electronic device.

In a possible implementation, after the electronic device receives the second positioning assistance data that is broadcast by the server at the second time interval in response to the second setting information, when the electronic device detects that the electronic device meets a second preset condition, the electronic device sends the first setting information to the server, where the second preset condition includes any one of the following: The electronic device is in a multipath area, a moving speed of the electronic device is greater than a preset speed threshold, or positioning precision of the electronic device is greater than a second preset precision threshold. The electronic device receives the positioning assistance data broadcast by the server at the first time interval in response to the first setting information.

In this way, when the electronic device enters the multipath area, or the moving speed. of the electronic device is greater than the preset speed threshold (for example, 80 km/h), or the positioning precision of the electronic device is greater than a second preset precision threshold, the electronic device may reduce an interval at which the server broadcasts positioning assistance data, thereby improving positioning accuracy.

In a possible implementation, after the electronic device stops receiving the positioning assistance data broadcast by the server, when the electronic device detects that a quantity of satellites whose signal intensity is greater than a first signal strength threshold is greater than a second threshold, the electronic device sends the first setting information to the server. The electronic device receives the positioning assistance data broadcast by the server at the first time interval in response to the first setting information.

In this way, when the electronic device exits the special scenario (for example, leaving a tunnel, going outdoors, or re-entering a service area of a reference station), the electronic device may enter an extreme performance mode, and send the first setting information to the server, where the first setting information is used to indicate the server to broadcast the positioning assistance data to the electronic device at a first time interval (for example, one second). In this way, the electronic device may quickly obtain the high-precision location information when exiting the special scenario.

In a possible implementation, when the electronic device detects that a quantity of satellites whose signal intensity is greater than a third signal intensity threshold is less than a first quantity and greater than a second quantity, the electronic device determines that the electronic device is in a multipath area, where the first quantity is greater than the second quantity.

In a possible implementation, before the electronic device sends the first setting information to the server, the electronic device sends a high-precision positioning request to the server, where the high-precision positioning request includes authentication information. The electronic device receives authentication success information sent by the server, where the authentication success information is used to indicate that the electronic device has completed authentication. The electronic device sends the first setting information to the server in response to the authentication success information.

In a possible implementation, the electronic device resolves high-precision positioning information based on the positioning assistance data and GNSS location information obtained by using a GNSS chip.

According to a fourth aspect, this application provides a chip system, including an application processor, a GNSS chip, and a wireless communications chip, where the application processor is configured to indicate, in response to a detected first input, the wireless communications chip to send first selling information to a server, where the first setting information is used to set a time interval at which the server broadcasts positioning assistance data as a first time interval. The GNSS chip is configured to resolve first GNSS location information.

The application processor is further configured to indicate the wireless communications chip to send the first GNSS location information to the server. The wireless communications chip is configured to receive first positioning assistance data that is broadcast by the server at the first time interval and that is determined based on the first GNSS location information and measurement data reported by N reference stations, where N is a positive integer. The wireless communications chip is further configured to send the first positioning assistance data to the application processor. The application processor is further configured to resolve first high-precision positioning information based on the first GNSS location information and the first positioning assistance data. The application processor is further configured to: when it is detected that the chip system meets a first preset condition, instruct the electronic device to send second setting information to the server, where the second setting information is used to set a time interval at which the server broadcasts positioning assistance data as a second time interval, and the second time interval is longer than the first time interval. The application processor is further configured to indicate the wireless communications chip to send second GNSS location information to the server. The wireless communications chip is further configured to receive second positioning assistance data that is broadcast by the server at the second time interval and that is determined based on the second GNSS location information and measurement data reported by the N reference stations. The wireless communications chip is further configured to send the second positioning assistance data to the application processor. The application processor is further configured to resolve second high-precision positioning information based on the second GNSS location information and the second positioning assistance data.

According to the positioning system provided in this application, when an electronic device completes common positioning by using a GNSS chip for the first time and obtains GLASS location information, the electronic device may enter an extreme performance mode, and send first setting information to a server, where the first setting information is used to indicate the server to broadcast positioning assistance data to the electronic device at a first time interval (for example, one second). When high-precision positioning succeeds and the positioning precision is lower than the first preset precision (lower positioning precision indicates a more accurate positioning result), the electronic device may enter a normal mode, and send second setting information to the server, where the second setting information is used to indicate the server to broadcast the positioning assistance data to the electronic device at a second time interval (for example, 60 seconds). The first time interval is shorter than the second time interval. In this way, the electronic device can prolong an interval for requesting the positioning assistance data as much as possible while ensuring high-precision positioning performance, thereby reducing power consumption of the electronic device.

According to a fifth aspect, this application provides an electronic device, including one or more processors and one or more memories. The one or more memories are coupled to the one or more processors. The one or more memories are configured to store computer program code, and the computer program code includes computer instructions. When the one or more processors execute the computer instructions, the electronic device performs the low-powerconsumption positioning method in any one of the possible implementations of any one of the foregoing aspects.

According to a sixth aspect, an embodiment of this application provides a computer storage medium, including computer instructions. When the computer instructions are run on an electronic device, the electronic device performs the low-power-consumption positioning method in any one of the possible implementations of any one of the foregoing aspects.

According to a seventh aspect, an embodiment of this application provides a computer program product. When the computer program product is run on a computer, the computer performs the low-power-consumption positioning method in any one of the possible implementations of any one of the foregoing aspects.

BRIEF DESCRIPTION OF DRAWINGS

FIG. 9B is a cumulative distribution function curve of satellite geometric distribution in different outdoor environments according to an embodiment of this application;

FIG. 11A to FIG. 11C are a schematic flowchart of a low-power-consumption positioning method according to an embodiment of this application;

DESCRIPTION OF EMBODIMENTS

The following clearly describes technical solutions in embodiments of this application in detail with reference to the accompanying drawings. In the descriptions of embodiments of this application, unless otherwise specified, "/"

indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

First, a schematic diagram of an architecture of a positioning system 10 according to this application is described.

Figure 1:
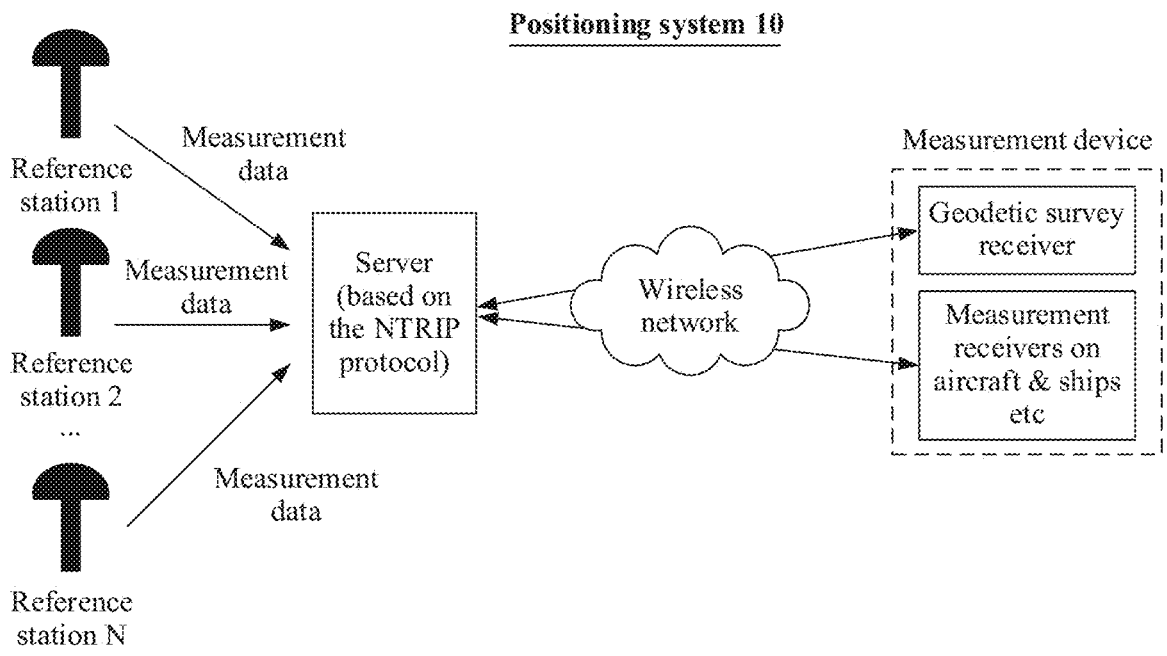
FIG. 1 is a schematic diagram of an architecture of a positioning system according to an embodiment of this application.

FIG. 1 shows a schematic diagram of an architecture of a positioning system 10 according to an embodiment of this application. As shown in. FIG. 1, the positioning system 10 includes N continuously operating reference stations (continuously operating reference station, CORS) (reference stations for short), a server, and a measurement device, where N is a positive integer.

The N reference stations may be distributed in different areas. A location of the reference station is generally fixed. The reference station stores an accurate location of the reference station. When establishing a connection to the server, the reference station may send the accurate location of the reference station to the server. Each reference station may collect a satellite positioning signal in real time (for example, every second), obtain measurement data, and send the measurement data to the server.

The server stores accurate locations of the N reference stations. The server may obtain differential data of different areas based on accurate location information of the reference station and the measurement data. The server and the measurement device may implement radio link establishment, authentication, data exchange, and the like with reference to the NTRIP protocol. When the server receives a reference location sent by the measurement device, the server may determine a reference location that is in the N reference stations and that is closest to the measurement device as a target reference location, and send differential data of the target reference station as positioning assistance data to the measurement device. The positioning assistance data may be RTK data, ephemeris data, RTD data or correction data (correction data), and other data transmitted by using a differential signal format (RTCM).

The measurement device may include a geodetic survey receiver, a measurement receiver carried on an aircraft, a ship, or the like. After receiving the positioning assistance data sent by the server, the measurement device may correct, based on the positioning assistance data, a measured satellite positioning result, to obtain a high-precision positioning result.

Figure 2:
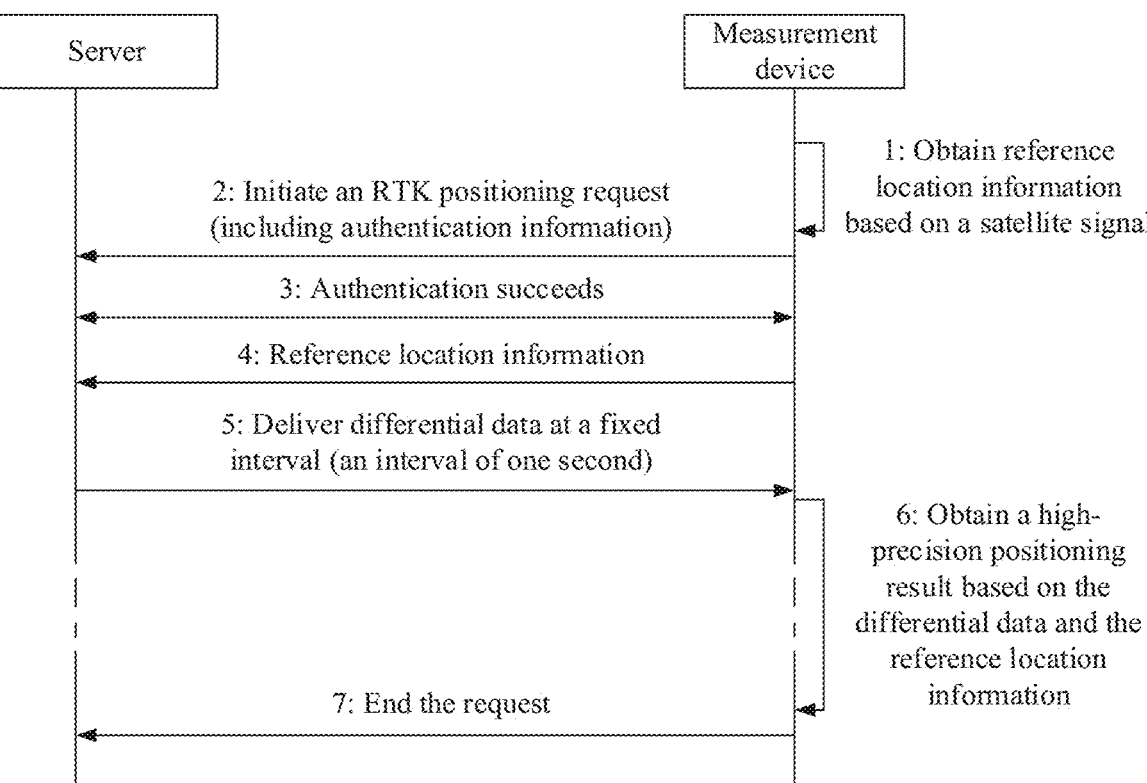
FIG. 2 is a schematic flowchart of an RTK positioning method according to an embodiment of this application.

FIG. 2 shows a schematic flowchart of an RTK positioning method according to this application.

As shown in FIG. 2, a procedure of interaction between a server and a measurement device includes the following steps.

1. The measurement device may calculate reference location information (for example, pseudo-range-based single-point positioning) by using a satellite signal detected by a GNSS chip.

2. After calculating the reference location information by using the GNSS chip, the measurement device may initiate an RTK positioning request to the server, where the RTK positioning request includes authentication information (for example, service account information), and the authentication information may be used by the server to perform authentication on the measurement device.

3. The server successfully authenticates the measurement device based on the authentication information carried in the RTK location request.

4. After the authentication succeeds, the measurement device may periodically (for example, at an interval of 4 seconds) upload a locally obtained reference location to the server.

5. The server may determine, based on the reference location information, an area in which the measurement device is located. The server determines positioning assistance data from measurement data of N reference stations based on an area in which the measurement device is located. The server delivers the positioning assistance data to the measurement device at a fixed period (for example, at an interval of one second).

6. The measurement device may continuously complete RTK resolving based on the positioning assistance data and the reference location information, to obtain a high-precision positioning result.

7. After a high-precision positioning task ends, the measurement device may send a positioning, end request to the server. After receiving the server positioning end request, the server may disconnect from the measurement device.

According to the foregoing NTRIP, after the measurement device establishes a connection to the server, data exchange between the measurement device and the server needs to be performed in real time (for example, a period is one second), and power consumption is very high. It can be learned from experimental data that, compared with a common positioning procedure (pseudo-range-based single-point positioning), power consumption of a smartphone in the foregoing high-precision positioning procedure on alp LTE network is increased by more than 40 mA (mA) per hour, and power consumption of a smartphone in a 5G network is increased by more than 80 mA (mA) per hour.

Figure 3:
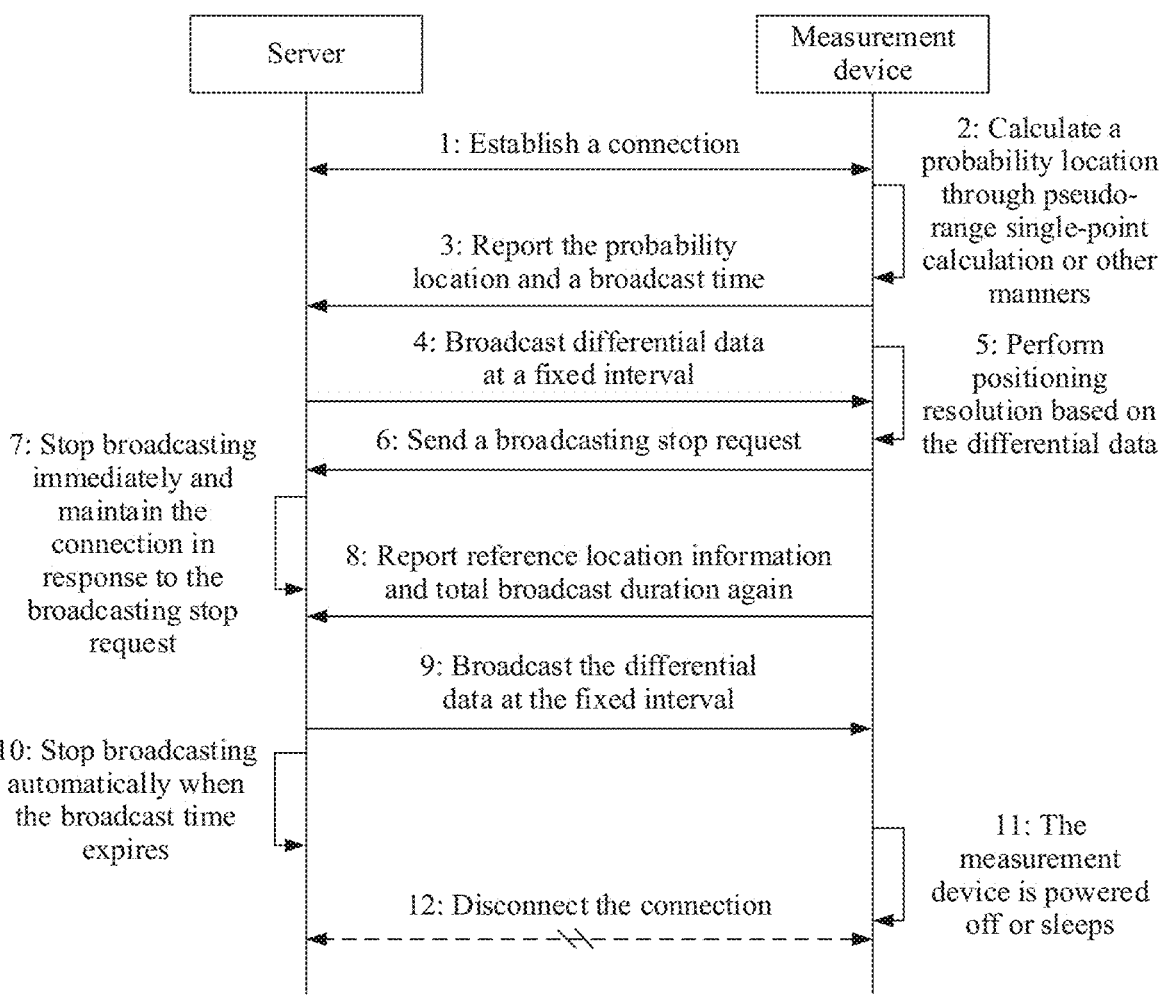
FIG. 3 is a schematic flowchart of another RTK positioning method according to an embodiment of this application.

FIG. 3 shows a schematic flowchart of another RTK positioning method according to this application.

As shown in FIG. 3, a procedure of the RTK positioning method may include the following steps.

1: A measurement device establishes a connection to a server.

2: The measurement device calculates a probability position through pseudo-range single-point calculation or in other manners.

3: The measurement device reports the probability location and a broadcast time to the server. The broadcast time may be used to request duration of broadcast positioning assistance data by the server.

4: After receiving the probability location and the broadcast time reported by the measurement device, the server may determine, based on the probability location, the positioning assistance data from measurement data of N reference stations (for example, calculate a corrected value of the measurement data of the reference station closest to the measurement device as the positioning assistance data), and the server delivers the positioning assistance data to the measurement device at a fixed period (for example, at an interval of one second).

5: The measurement device performs positioning resolution based on the positioning assistance data and the probability location, to obtain a high-precision positioning result.

6: The measurement device may send a broadcasting stop request to the server based on a requirement.

7: The server may immediately stop broadcasting the positioning assistance data to the measurement device in response to the broadcasting stop request.

8: The measurement device reports the probability location and the broadcast time to the server again. The broadcast time may be used to request duration of broadcast positioning assistance data by the server.

9: After receiving the probability location and the broadcast time reported by the measurement device, the server may determine, based on the probability location, the positioning assistance data from the measurement data of the N reference stations (for example, calculate a corrected value of the measurement data of the reference station closest to the measurement device as the positioning assistance data). The server delivers the positioning assistance data to the measurement device at a fixed period (for example, at an interval of one second).

10: When duration for sending the positioning assistance data after the server receives the broadcast time is greater than the broadcast time, the server automatically stops sending the positioning assistance data to the measurement device.

11 and 12: When the measurement device is powered off or sleeps, the measurement device may be disconnected from the server.

In the foregoing procedure, the measurement device and the server may reduce power consumption in two manners: Manner 1: The measurement device may send a broadcasting stop request to the server based on a requirement. After receiving the broadcasting stop request, the server may immediately stop broadcasting the positioning assistance data. Manner 2: When reporting the reference location information, the measurement device also sends the broadcast time to the server. After receiving the reference location information and the broadcast time that are reported by the measurement device, the server may start an automatic stop timer, and after the timer reaches the broadcasting time, the server automatically stops broadcasting the positioning assistance data to the measurement device.

In the foregoing procedure, only a setting of a broadcast time period is provided. For example, broadcasting is immediately stopped, or broadcasting is continuously performed for a specific time period. In the continuous broadcast time period, a broadcast interval of the positioning assistance data is fixed, and power consumption is relatively high in a high-precision positioning process.

Figure 4:
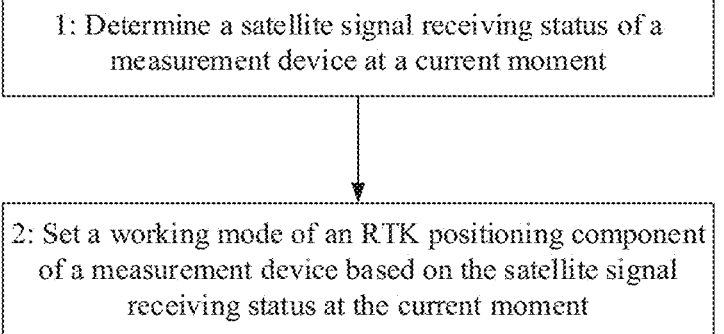
FIG. 4 is a schematic flowchart of an UK positioning mode control method according to an embodiment of this application.

FIG. 4 shows a flowchart of an RTK positioning mode control method according to this application.

As shown in FIG. 4, the RTK positioning mode control method may include the following steps.

1: A measurement device determines a satellite signal receiving status of the measurement device at a current moment.

2: The measurement device sets a working mode of an RTK positioning component of the measurement device based on the satellite signal receiving status at the current moment.

The measurement device may adjust the working mode of the RTK positioning component based on the satellite signal receiving status. In the following three conditions, the measurement device may set the working mode of the RTK positioning component to a low-power-consumption working mode.

1. Satellite signals received by the measurement device at the current moment include satellite signals transmitted by at most three satellites.
2. A carrier-to-noise ratio of the satellite signals transmitted by the at most three satellites in the satellite signals received by the measurement device at the current moment is greater than a preset threshold.
3. The measurement device cannot implement positioning based on the satellite signals received at the current moment.

The low-power-consumption working mode includes the following three types.

1. The measurement device sets the working mode of the RTK positioning component to a sleep mode.
2. The measurement device disables the RTK positioning component.
3. The measurement device resets the RTK component at a preset frequency.

In the foregoing procedure, the measurement device uses only the satellite signals as a determining basis, accuracy is relatively low, and an error easily occurs. In a low-power consumption working mode, an RTK function fails, and the measurement device cannot continuously obtain a high-precision result. In a normal working mode, a broadcast interval of positioning assistance data is fixed, and power consumption is relatively high in a high-precision positioning process.

Therefore, embodiments of this application provides a low-power-consumption positioning method, to dynamically set, based on a high-precision positioning status, a scenario in which an electronic device is located, a moving speed of the electronic device, and the like, a broadcast policy of positioning assistance data delivered by a server, for example, different broadcasting intervals, and enabling or suspending broadcasting. In this way, the electronic device can prolong an interval for requesting assistance data as much as possible while ensuring high-precision positioning performance, thereby reducing power consumption of the electronic device.

The following describes a schematic diagram of a structure of an electronic device according to an embodiment of this application.

Figure 5:
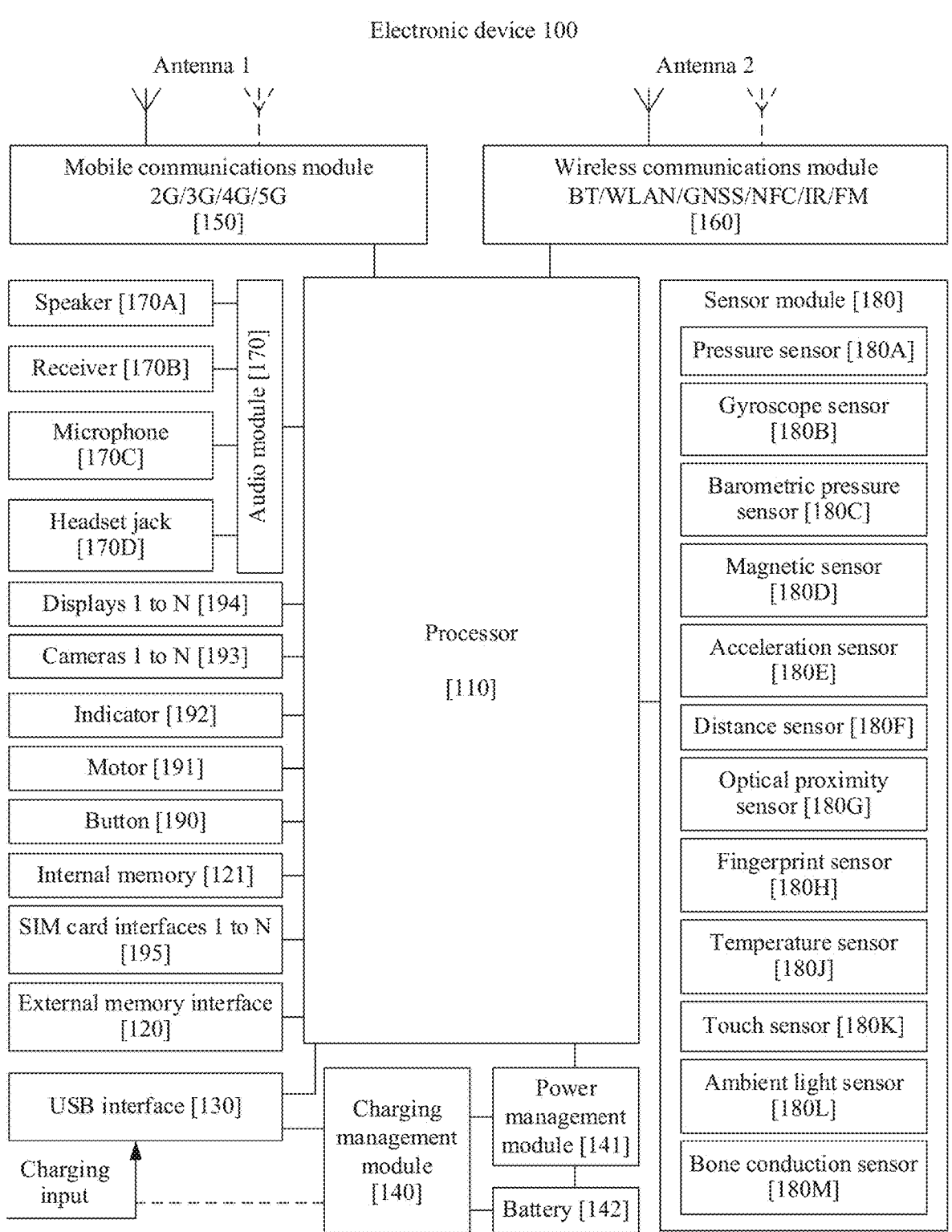
FIG. 5 is a schematic diagram of a structure of an electronic device according to an embodiment of this application.

FIG. 5 shows a schematic diagram of a structure of an electronic device 100.

The electronic device 100 is used as an example below to describe embodiments in detail. It should be understood that the electronic device 100 shown in FIG. 5 is merely an example, and the electronic device 100 may have more or fewer components than those shown in FIG. 5, or may combine two or more components, or may have different component configurations. The components shown in FIG. 5 may be implemented in hardware, software, or a combination of hardware and software including one or more signal processing and/or application-specific integrated circuits.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more: processing units. For example, the processor 110 may include an application processor (application processor, AP), a modem processor, a graphics processing unit (graphics processing unit, GPU), an image signal processor (image signal processor, TSP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIMS interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the 125 interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB port 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules that is shown in this embodiment of the present disclosure is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communications module 150 may provide a solution applied to the electronic device 100 for wireless communication such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some function modules in the mobile communications module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more CPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode. AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and a skin color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to: compress or decompress a digital video. The electronic device 100 may support one or more video codecs. In this way, the electronic device 100 may play back or record videos in a plurality of coding formats, for example, moving picture experts group (moving picture experts group, MPEG)1, MPEG2, MPEG3, and MPEG4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, fur example, al least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to: convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C array be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, an angular velocity of the electronic device 100 around three axes namely, axes x, y, and z) may be determined through the gyroscope sensor 180B. The gyroscope sensor 180B may be configured to implement image stabilization during photographing. For example, when the shutter is pressed, the gyroscope sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hail sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a touch panel. The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The following describes a positioning system provided in embodiments of this application.

Figure 6:
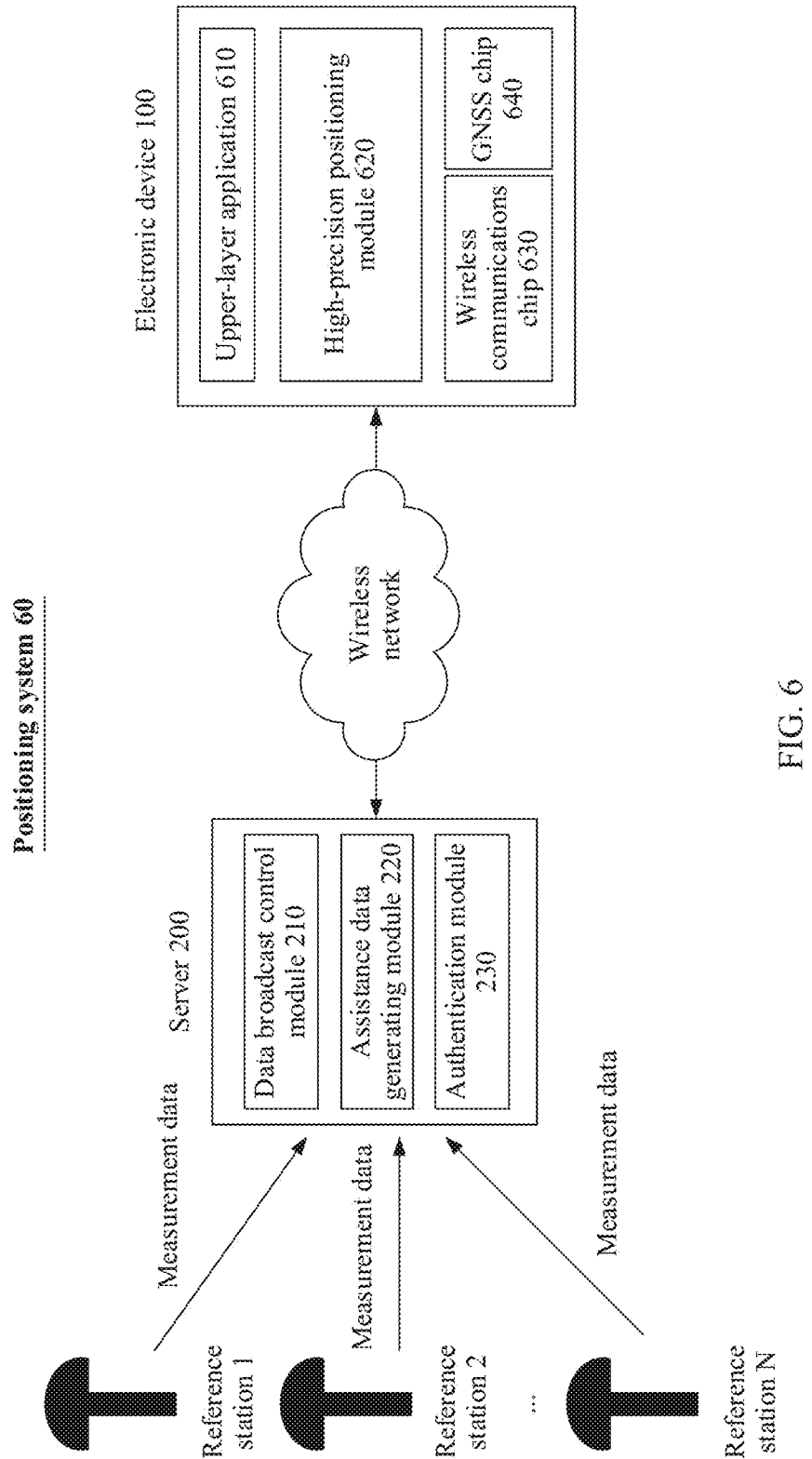
FIG. 6 is a schematic diagram of an architecture of a positioning system according to an embodiment of this application.

FIG. 6 shows a schematic diagram of an architecture of a positioning system 60 according to an embodiment of this application.

As shown in FIG. 6, the positioning system 60 includes N reference stations, a server 200, and an electronic device 100, where N is a positive integer. The electronic device 100 may communicate with the server 200 by using a network (for example, a 2G/3G/4G/5G mobile communications network or a Wi-Fi network).

The N reference stations may be distributed in different areas. A location of the reference station is generally fixed. The reference station stores an accurate location of the reference station. When establishing a connection to the server 200, the reference station may send the accurate location of the reference station to the server 200. Each reference station may collect a satellite positioning signal in real time (for example, every second), to obtain a measurement location. The reference station may determine the measurement data based on the saved accurate location and the measurement location, and send the measurement data to the server 200.

The server 200 stores accurate locations of the N reference station locations. The server 200 may receive and store measurement data of N reference stations in real time (for example, every second). The measurement data may be an observation value file, a navigation message, a carrier phase observation value, a measurement code pseudo-range observation value, and the like. The server 200 and the electronic device 100 may implement radio link establishment, authentication, data exchange, and the like with reference to the NTRIP protocol.

In a possible implementation, the server 200 may indirectly obtain the measurement data of the N reference stations from a third-party server (not shown in FIG. 6). The third-party server may directly obtain the measurement data reported by the N reference stations. For example, the third-party server obtains the measurement data reported by the N reference stations once every one second, and the server 200 may also obtain the measurement data of the N reference stations from the third-party server once ever one second.

The server 200 may include a data broadcasting control module 210, an assistance data. generating module 220, and an authentication module 230.

The authentication module 230 may be configured to perform authentication on the electronic device 100. After the authentication succeeds, the server 200 performs data exchange with the electronic device 100.

The assistance data generation module 220 may be configured to: after GNSS location information sent by the electronic device 100 is received, generate positioning assistance data from the measurement data of the N reference stations based on the GNSS location information. The positioning assistance data may be RTK data, ephemeris data, RTD data or correction data (correction data), and other data transmitted by using a differential signal format (RTCM).

In this embodiment of this application, the server 200 may generate the positioning assistance data from the measurement data of the N reference stations based on the GNSS location information by using the following RTK positioning technologies.

1. Virtual Reference Station (Virtual Reference Station, VRS) Technology

The N reference stations may send the measurement data to the server 200 in real time (for example, every one second), where the measurement data includes an observation value file, a navigation message, a carrier phase observation value, a code pseudo-range observation value, and the like. After receiving the GNSS location information sent by the electronic device 100, the server 200 may determine a group of optimal reference stations based on the GNSS location information and the accurate locations of the N reference stations and according to a specific networking principle. Then, the server 200 may simulate a virtual reference station around the electronic device 100 based on the measurement data sent by the group of optimal reference stations. The server 200 may obtain, through interpolation based on an overall corrected orbit error of a GNSS satellite and an error caused by an ionization delay and a tropospheric delay when a GNSS signal passes through the atmosphere, a modified value affected by each error source corresponding to the virtual reference station. The server 200 may send, to the electronic device 100, the modified value affected by each error source corresponding to the virtual reference station as the positioning assistance data. After receiving the positioning assistance data, the electronic device 100 may determine high-precision positioning information of the electronic device 100 based on the measurement data and the positioning assistance data of the electronic device 100 through differential resolution.

2. Master-Auxiliary Concept (Master-Auxiliary Concept, MAC) Technology

The N reference stations may send the measurement data to the server 200 in real time (for example, every one second), where the measurement data includes an observation value file, a navigation message, a carrier phase observation value, a code pseudo-range observation value, and the like. After receiving the GNSS location information sent by the electronic device 100, the server 200 may determine, based on the GNSS location information and the accurate locations of the N reference stations, a reference station closest to the electronic device 100 as a master reference station, and use other reference stations within a radius range as auxiliary reference stations. The server 200 may determine, based on the measurement data of the master reference station and the auxiliary reference station, a differential correction number of the master reference station and differences of the auxiliary reference stations relative to the correction number of the master station. The server 200 may use the differential correction number of the master reference station and the differences of the auxiliary reference stations relative to the correction number of the master station as the positioning assistance data, and send the positioning assistance data to the electronic device 100. The electronic device 100 performs weighted correction on the measurement data of the electronic device 100 based on the positioning assistance data, to obtain high-precision positioning information.

This embodiment of this application is not limited to the foregoing two RTK positioning technologies, and may be further applicable to another RTK positioning technology.

The data broadcasting control module 210 may be configured to control, based on setting information sent by the electronic device 100, a time interval and total duration of broadcasting the positioning assistance data to the electronic device 100. For example, the electronic device 100 may send setting information to the server 200, and the data broadcasting control module 210 of the server 200 may control, based on the setting information, a broadcasting interval of the positioning assistance data to be 60 seconds, one second, or the like, or control to start/stop broadcasting the positioning assistance data.

The electronic device 100 may include an upper-layer application 610, a high-precision positioning module 620, a wireless communications chip 630, and a GNSS chip 640.

The GNSS chip 640 may receive a satellite signal, and obtain measurement information used for positioning resolving. The measurement information may include information such as a pseudo-range, a carrier phase, and a Doppler frequency. The GNSS chip 640 may further complete resolving of common positioning based on the measurement information, to obtain the GNSS location information. The GNSS chip 640 may report the GNSS location information and the measurement information to the high-precision positioning module 620. In a possible implementation, the GNSS chip 640 may further calculate speed information of the electronic device 100 based on the measurement information, and send the speed information of the electronic device 100 to the high-precision positioning module 620.

The wireless communications chip 630 may implement a basic data communication function, for example, a communication function such as 2G/3G/4G/5G network communication or Wi-Fi communication. The wireless communications chip 630 may receive a data service request sent by the upper-layer application 610 or the high-precision positioning module 620, and the wireless communications chip 630 may send, in response to the data service request, data that needs to be sent by the upper-layer application 610 or the high-precision positioning module 620.

The high-precision positioning module 620 may complete high-precision positioning resolving based on the GNSS location information and the measurement information that are reported by the GNSS chip 640 and the positioning assistance data sent by the server 200, to obtain high-precision positioning information. After obtaining the high-precision positioning information, the high-precision positioning module 620 may send the high-precision positioning information to the upper-layer application 610. The high-precision positioning module 620 may further determine, based on factors such as a high-precision positioning status, a scenario in which the electronic device 100 is located, and a moving speed of the electronic device 100, a broadcasting policy (for example, a broadcasting interval, and enabling or suspending broadcasting) of the positioning assistance data. The high-precision positioning module 620 may further instruct the wireless communications chip 630 to send the setting information to the server 200, where the setting information is used to set a policy (for example, a broadcasting interval, or enabling or suspending broadcasting) of broadcasting the positioning assistance data by the server 200. After the policy of broadcasting the positioning assistance data by the server 200 is set, the high-precision positioning module 620 may instruct the wireless communications chip 630 to send the GNSS location information to the server 200.

After receiving the high-precision location information reported by the high-precision positioning module 620, the upper-layer application 610 may display a high-precision service based on the high-precision location information, for example, display high-precision positioning information, navigation and voice prompt, and real-time road condition prompt.

In this embodiment of this application, a device type of the electronic device 100 may include a mobile phone, a television, a tablet computer, a sound box, a watch, a desktop computer, a laptop computer, a handheld computer, a notebook computer, an ultra-mobile personal computer (ultra-mobile personal computer, UMPC), a netbook, a personal digital assistant (personal digital assistant, PDA), an augmented reality (Augmented reality, AR)/virtual reality (virtual reality, VR) device, an in-vehicle computer, and the like. A specific type of the electronic device 100 is not specially limited in this embodiment of this application.

The following specifically describes function modules of the electronic device 100.

Figure 7:
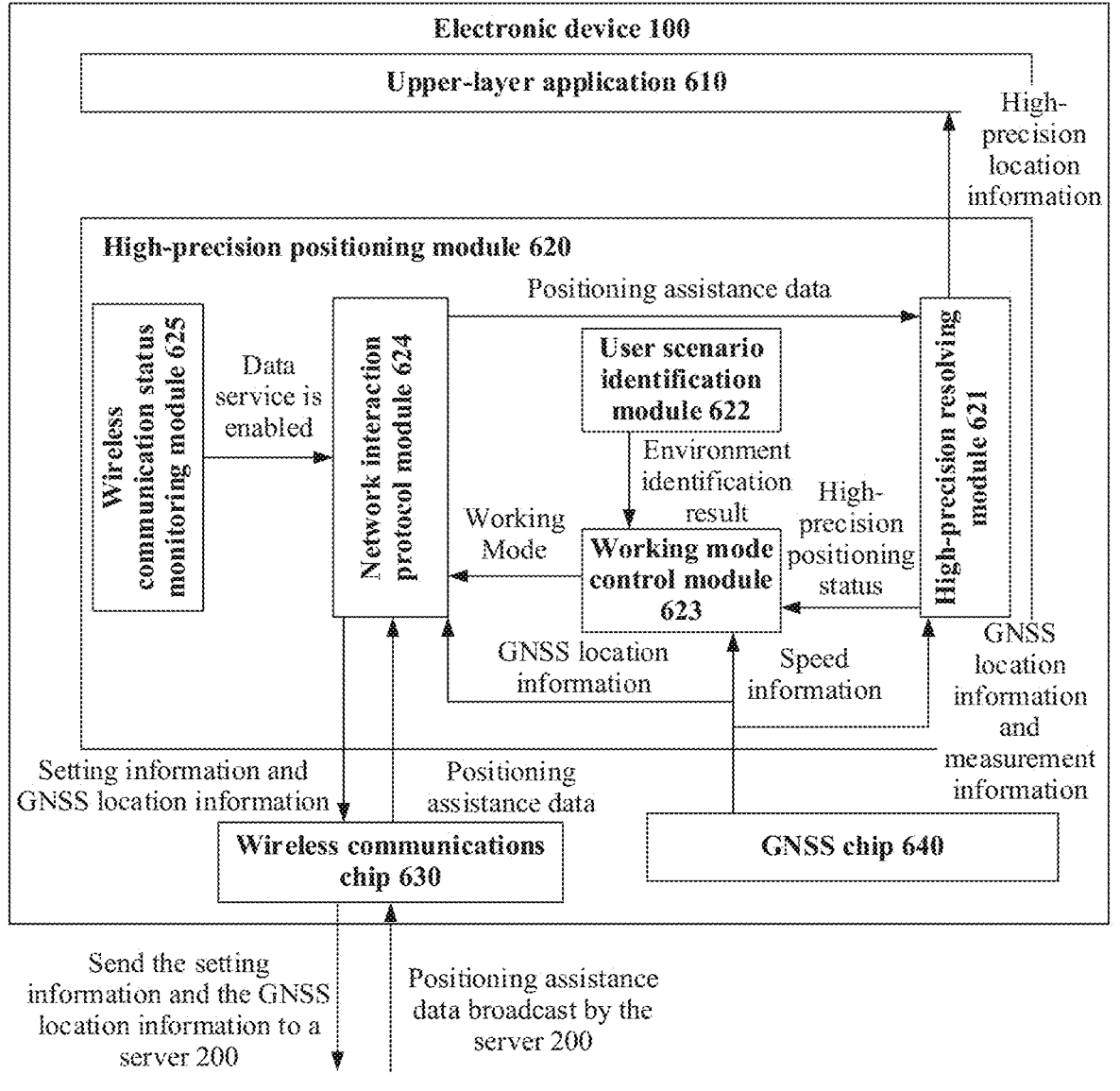
FIG. 7 is a schematic diagram of function modules of an electronic device according to an embodiment of this application.

FIG. 7 shows a schematic diagram of function modules of an electronic device 100 according to an embodiment of this application.

As shown in FIG. 7, the electronic device 100 may include an upper-layer application 610, a high-precision positioning module 620, a wireless communications chip 630, and a GNSS chip 640.

The high-precision positioning module 620 includes a high-precision resolving module 621, a user scenario identification module 622, a working mode control module 623, a network interaction protocol module 624, and a wireless communication status monitoring module 625.

The GNSS chip 640 may obtain measurement information based on received satellite signals. The measurement information may include a pseudo range, a carrier phase, a Doppler frequency, and the like. The GNSS chip 640 may calculate GNSS location information and speed information of the electronic device 100 based on the measurement information. The GNSS chip 640 may send the GNSS location information and the measurement information to the high-precision resolving module 621, send the speed information to the working mode control module 623, and send the GNSS location information to the network interaction protocol module 624. The GNSS chip 640 may send GNSS signal status information to the user scenario identification module 622. The GNSS signal status information includes a quantity of satellite signals found by the electronic device 100, signal intensity of each satellite signal, a quantity of visible satellites (satellites whose signal intensity is greater than a third signal intensity threshold (for example, 25 dB-Hz), satellite geometric distribution, a quantity of multipath satellites (satellites having a multipath effect), and the like.

The high-precision resolving module 621 may resolve high-precision positioning information based on the GNSS location information, the measurement information, and the positioning assistance data. After resolving the high-precision positioning information, the high-precision resolving module 621 may upload the high-precision positioning information to the upper-layer application 610. The high-precision resolving module 621 may calculate positioning precision when resolving the high-precision positioning information. The high-precision resolving module 621 may provide a high-precision positioning status to the working mode control module 623, where the high-precision positioning status includes a high-precision positioning success/failure and positioning precision when the high-precision positioning succeeds.

The high-precision resolving module 621 may calculate the high-precision positioning information based on the GNSS location information, measurement data, and the positioning assistance data by using a Kalman (Kalman) filter. A covariance matrix of the Kalman (Kalman) filter may be used to provide an estimated positioning precision value.

The user scenario identification module 622 may identify, based on the GNSS signal status information, an environment in which the electronic device 100 is located. For example, the electronic device 100 is located in a tunnel/indoors, a multipath area, an open area, or an area under an elevated road. The user scenario identification module 622 may provide an identification result of an environment in which the electronic device 100 is located to the working mode control module 623.

Specifically, the user scenario identification module 622 may obtain a first feature sequence in the GNSS signal state information. The first feature sequence includes one or more of a quantity of satellites whose signal intensity is greater than a first signal intensity threshold (for example, 15 dB-Hz), a quantity of satellites whose signal intensity is less than a second signal intensity threshold (for example, 8 dB-Hz), and the like. The first signal intensity threshold is greater than the second signal intensity threshold. The user scenario identification module 622 may determine, based on the first feature sequence, whether the electronic device 100 is in a tunnel (which may also be referred to as indoors).

When the user scenario identification module 622 identifies that the electronic device 100 is outside a tunnel (which may also be referred to as outdoor), the user scenario identification module 622 may obtain a second feature sequence in the GNSS signal status information, where the second feature sequence includes one or more of a quantity of visible satellites (satellites whose signal intensity is greater than a third signal intensity threshold (for example, 25 dB-Hz), satellite geometric distribution, a proportion of multipath satellites, and the like. The user scenario identification module 622 may determine, based on the second feature sequence, whether the electronic device 100 is located in an open area, a multipath area, or an area under an elevated road.

Figure 8:
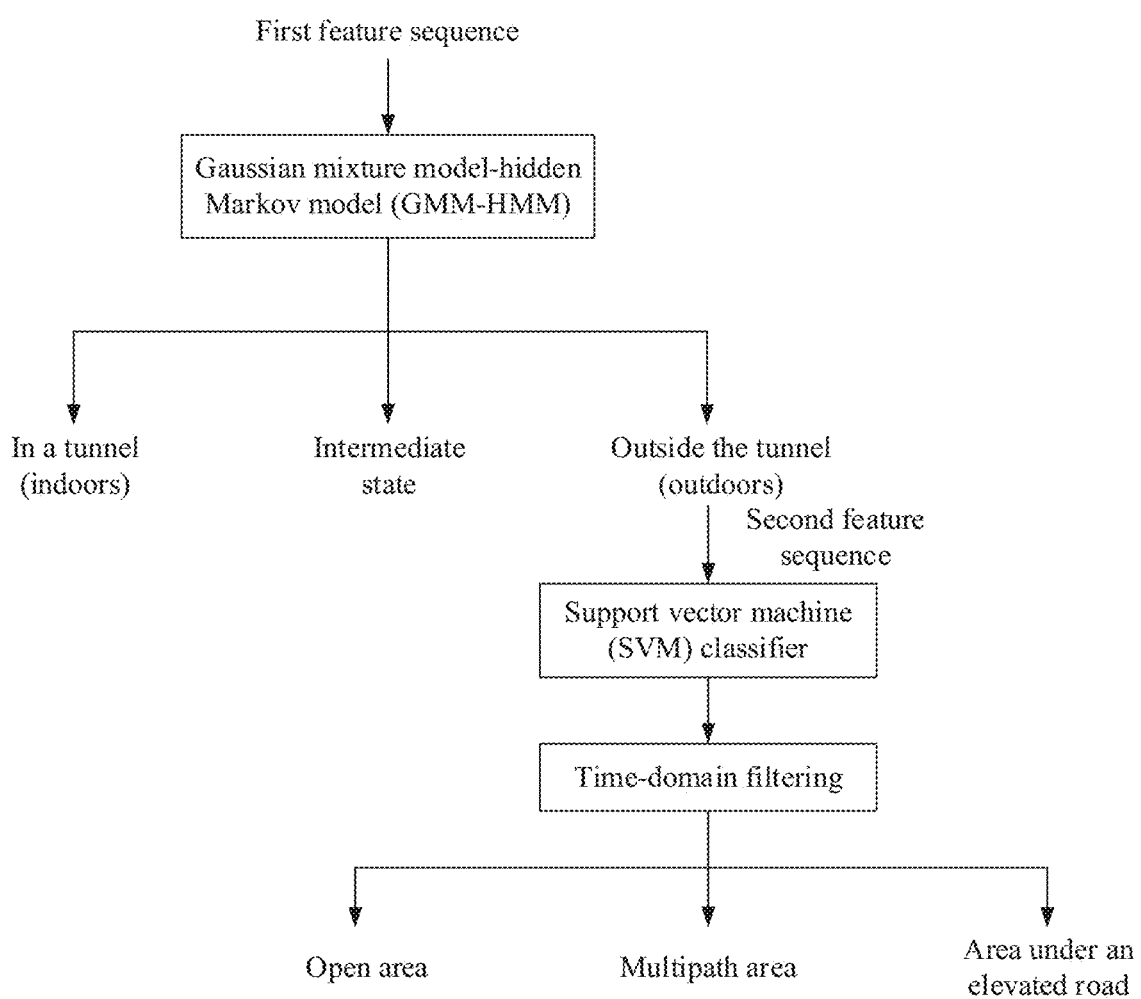
FIG. 8 is a schematic flowchart of user scenario identification according to an embodiment of this application.

In a possible implementation, as shown in FIG. 8, the user scenario identification module 622 may input the first feature sequence in the GNSS signal status information into a Gaussian mixture model-hidden. Markov model (gaussian mixture model-hidden markov model), and determine whether the electronic device 100 is in a tunnel (which may also be referred to as indoors). When the user scenario identification module 622 is located outside a tunnel (which may also be referred to as outdoor), the user scenario identification module 622 may input the second feature sequence in the GNSS signal status information to a support vector machine classifier for dynamic identification, to determine whether the electronic device 100 is located in an open area, a multipath area, or an area under an elevated road.

Figure 9A:
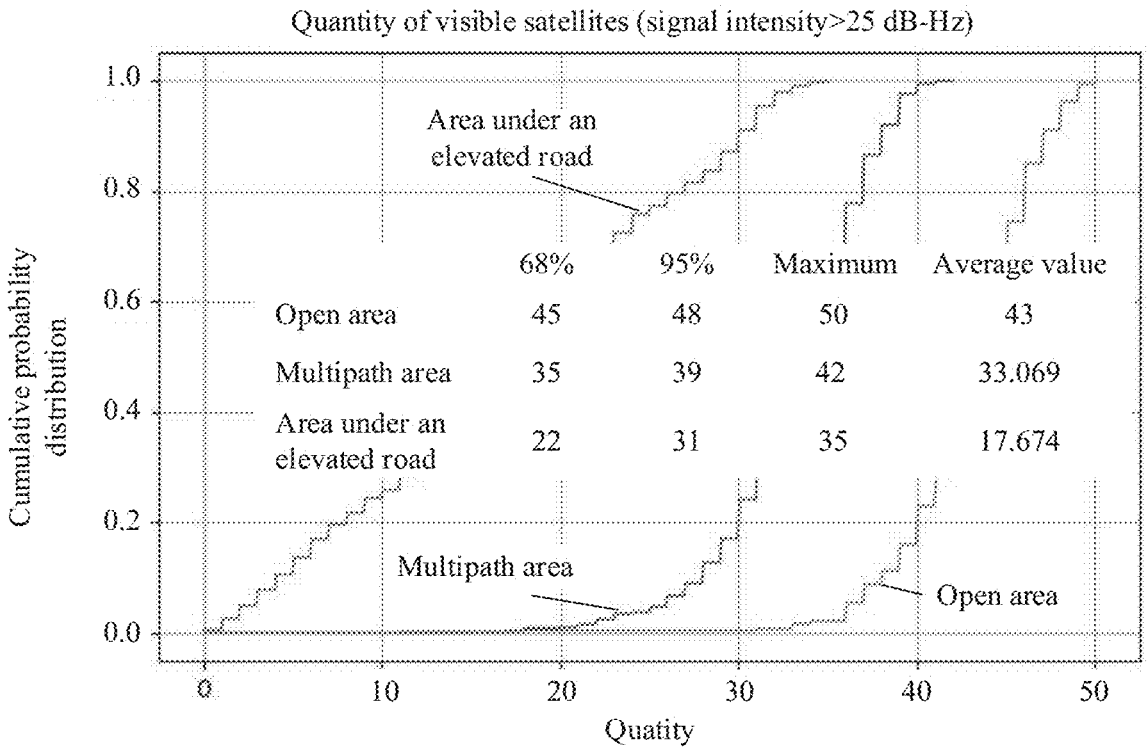
FIG. 9A is a cumulative probability distribution function curve of a quantity of visible satellites in different outdoor environments according to an embodiment of this application.

FIG. 9A shows a cumulative probability distribution function curve of a quantity of visible satellites (satellites whose signal intensity is greater than third signal intensity (for example, 25 dB-Hz)) in different outdoor environments.

As shown in FIG. 9A, when a cumulative probability in an open area is 68%, the quantity of visible satellites is 45; when the cumulative probability in an open area is 95%, the quantity of visible satellites is 48; a maximum value of the quantity of visible satellites in an open area is 50; and an average value of the quantity of visible satellites in an open area is 43.

When the cumulative probability in a multipath area is 68%, the quantity of visible satellites is 35; when the cumulative probability in a multipath area is 95%, the quantity of visible satellites is 39; a maximum value of the quantity of visible satellites in a multipath area is 42; and an average quantity of visible satellites in a multipath area is 33.069.

When the cumulative probability in an area under an elevated road is 68%, the quantity of visible satellites is 22; when the cumulative probability in an area under an elevated road is 95%, the quantity of visible satellites is 31, a maximum value of the quantity of visible satellites in an area under an elevated road is 35; and an average quantity of visible satellites in an area under an elevated road is 17.674.

A relationship between quantities of visible satellites in different areas is as follows: a quantity of visible satellites in an open area>a quantity of visible satellites in a multipath area>a quantity of visible satellites in an area under an elevated road.

Figure 9B:
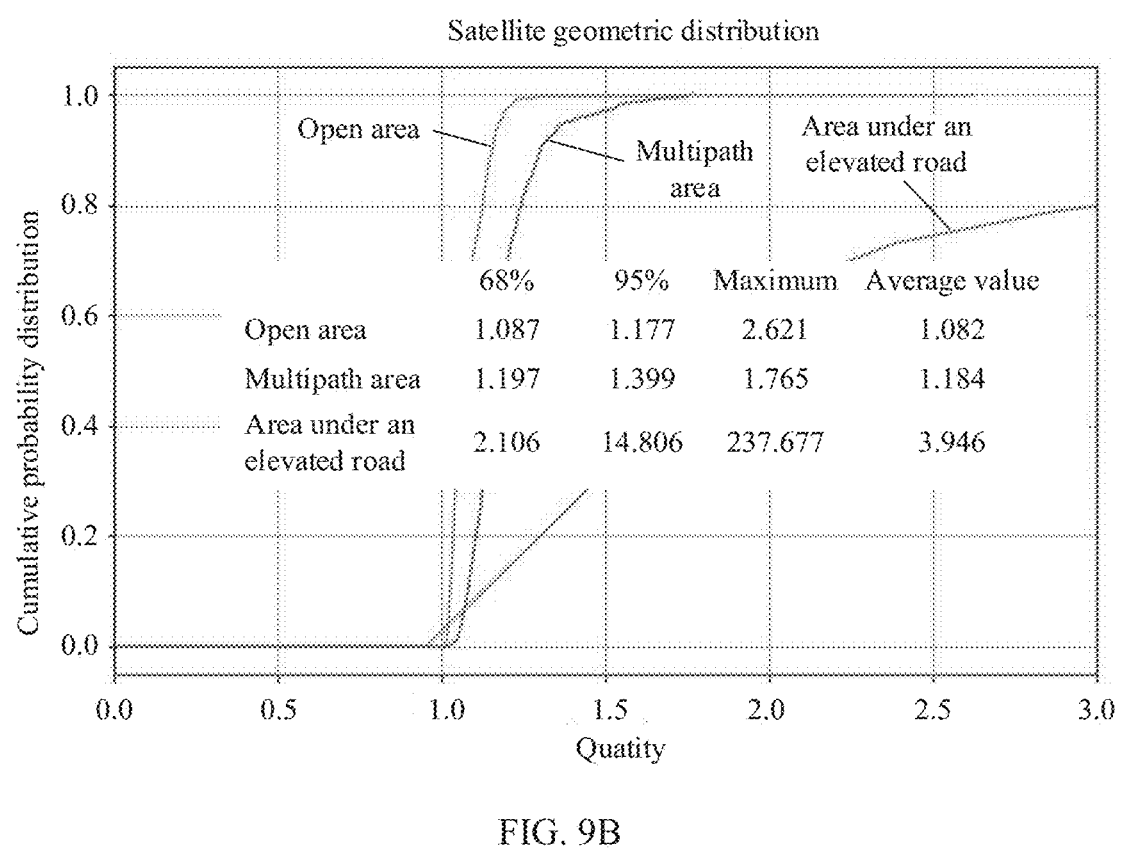

FIG. 9B shows a cumulative distribution function curve of satellite geometric distribution in different outdoor environments.

As shown in FIG. 9B, when a cumulative probability in an open area is 68%, a geometric dilution of precision (dilution of precision, DOP) of satellites is 1.087; when the cumulative probability in an open area is 95%, the geometric dilution of precision of satellites is 1.177; a maximum value of the geometric dilution of precision in an open area is 2.621; and an average value of the geometric dilution of precision in an open area is 1.082.

When the cumulative probability in a multipath area is 68%, the geometric dilution of precision of satellites is 1.197; When the accumulated probability in a multipath area is 95%, the geometric dilution of precision of satellites is 1.399; a maximum value of the geometric dilution of precision in a multipath area is 1.765; and an average value of the geometric precision factors in a multi path area is 1.184.

When the cumulative probability in an area under an elevated road is 68%, the geometric dilution of precision of satellites is 2.106; when the accumulated probability in an area under an elevated road is 95%, the geometric dilution of precision of satellites is 14.806; a maximum geometric dilution of precision in the area under an elevated road is 237.677; and an average geometric dilution of precision in an area under an elevated road is 3.946.

A relationship between geometric dilutions of precision of satellites in different areas is as follows: a geometric dilution of precision of satellites in an open area<a geometric dilution of precision of satellites in a multipath area<a geometric dilution of precision of satellites in an area under an elevated road.

Figure 9C:
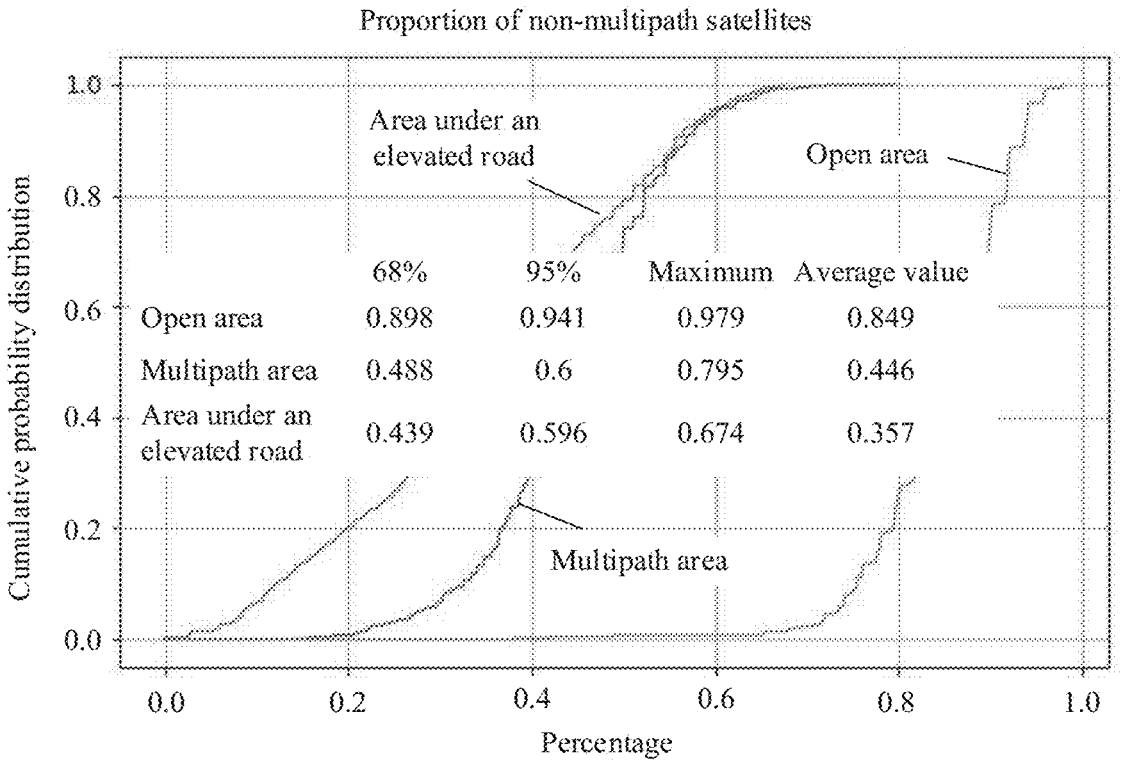
FIG. 9C is a cumulative distribution function curve of a proportion of non-multipath satellites in different outdoor environments.

FIG. 9C shows a cumulative distribution function curve of a proportion of non-multipath satellites in different outdoor environments.

As shown in FIG. 9C, when a cumulative probability in an open area is 68%, a proportion of non-multipath satellites is 0.898; when the cumulative probability in an open area is 95%, a proportion of non-multipath satellites is 0.941; a maximum proportion of non-multipath satellites in an open area is 0.979; and an average proportion of non-multipath satellites in an open area is 0.849.

When the cumulative probability in a multipath area is 68%, the proportion of non-multipath satellites is 0.488; when the cumulative probability in a multipath area is 95%, the proportion of non-multipath satellites is 0.6; a maximum proportion of non-multipath satellites in a multipath area is 0.795; and an average proportion of non-multipath satellites in a multipath area is 0.446.

When the cumulative probability in an area under an elevated road is 68%, the proportion of non-multipath satellites is 0.439; when the accumulated probability in an area under an elevated road is 95%, the proportion of non-multipath satellites is 0.596; a maximum proportion of non-multipath satellites in an area under an elevated road is 0.674; and an average proportion of non-multipath satellites in an area under an elevated road is 0.357.

A relationship between proportions of non-multipath satellites in different areas is as follows: a proportion of non-multipath satellites in an open area>the proportion of non-multipath satellites in a multipath area>a proportion of non-multipath satellites in an area under an elevated road.

In a possible implementation, the user scenario identification module 622 may continuously obtain GNSS signal status information, and record, from the GNSS signal status information, the quantity of satellites whose signal intensity is greater than the first signal intensity threshold (for example, 15 dB-Hz). When the quantity of satellites whose signal intensity is greater than the first signal intensity threshold (for example, 15 dB-Hz) is less than or equal to a preset threshold A (for example, 4) and lasts for B (for example, 10) seconds, the user scenario identification module 622 may determine that the electronic device 100 enters the tunnel (is indoors). Alternatively, when the quantity of satellites whose signal intensity is greater than the first signal intensity threshold (for example, 15 dB-Hz) is greater than a preset threshold C (for example, 8), the user scenario identification module 622 may determine that the electronic device 100 exits the tunnel (is outdoors).

In a possible implementation, the user scenario identification module 622 may continuously obtain GNSS signal status information, and record, from the GNSS signal status information, the quantity of visible satellites (satellites whose signal intensity is greater than the third signal intensity (for example, 25 dB-Hz). When the user scenario identification module 622 detects that the quantity of visible satellites (satellites whose signal intensity is greater than the third signal intensity (for example, 25 dB-Hz)) is greater than a first quantity (for example, 43), the user scenario identification module 622 may determine that the electronic device 100 is in an open area. When the user scenario identification module 622 detects that the quantity of visible satellites (satellites whose signal intensity is greater than the third signal intensity (for example, 25 dB-Hz)) is less than a second quantity (for example, 17), the user scenario identification module 622 may determine that the electronic device 100 is located in an area under an elevated road. When the user scenario identification module 622 detects that the quantity of visible satellites (satellites whose signal intensity is greater than the third signal intensity (for example, 25 dB-Hz)) is greater than or equal to the second quantity (for example, 17) and less than or equal to the first quantity (for example, 43), the user scenario identification module 622 may determine that the electronic device 100 is in a multipath area. The first quantity is greater than the second quantity.

In another possible implementation, the user scenario identification module 622 may determine, based on only a geometric dilution of precision of satellites or a proportion of non-multipath satellites, whether the electronic device 100 is located in an open area, a multipath area, or an area under an elevated road.

The working mode control module 623 may obtain an environment identification result provided by the user scenario identification module 622. The working mode control module 623 may further obtain the high-precision positioning status provided by the high-precision module 621. The high-precision positioning status includes a high-precision positioning success/failure and positioning precision when the high-precision positioning succeeds. The working mode control module 623 may further obtain speed information provided by the GNSS chip 640. The working module 623 may determine a positioning working mode of the electronic device 100 based on information such as the high-precision positioning status, the environment identification result, and the speed information. The positioning working mode includes a normal mode, a suspending mode, and an extreme performance mode. After determining the positioning working mode of the electronic device 100, the working mode control module 623 may send the positioning working mode of the electronic device 100 to the network interaction protocol module 624. Different positioning work modes correspond to different positioning assistance data broadcasting policies.

Figure 10:
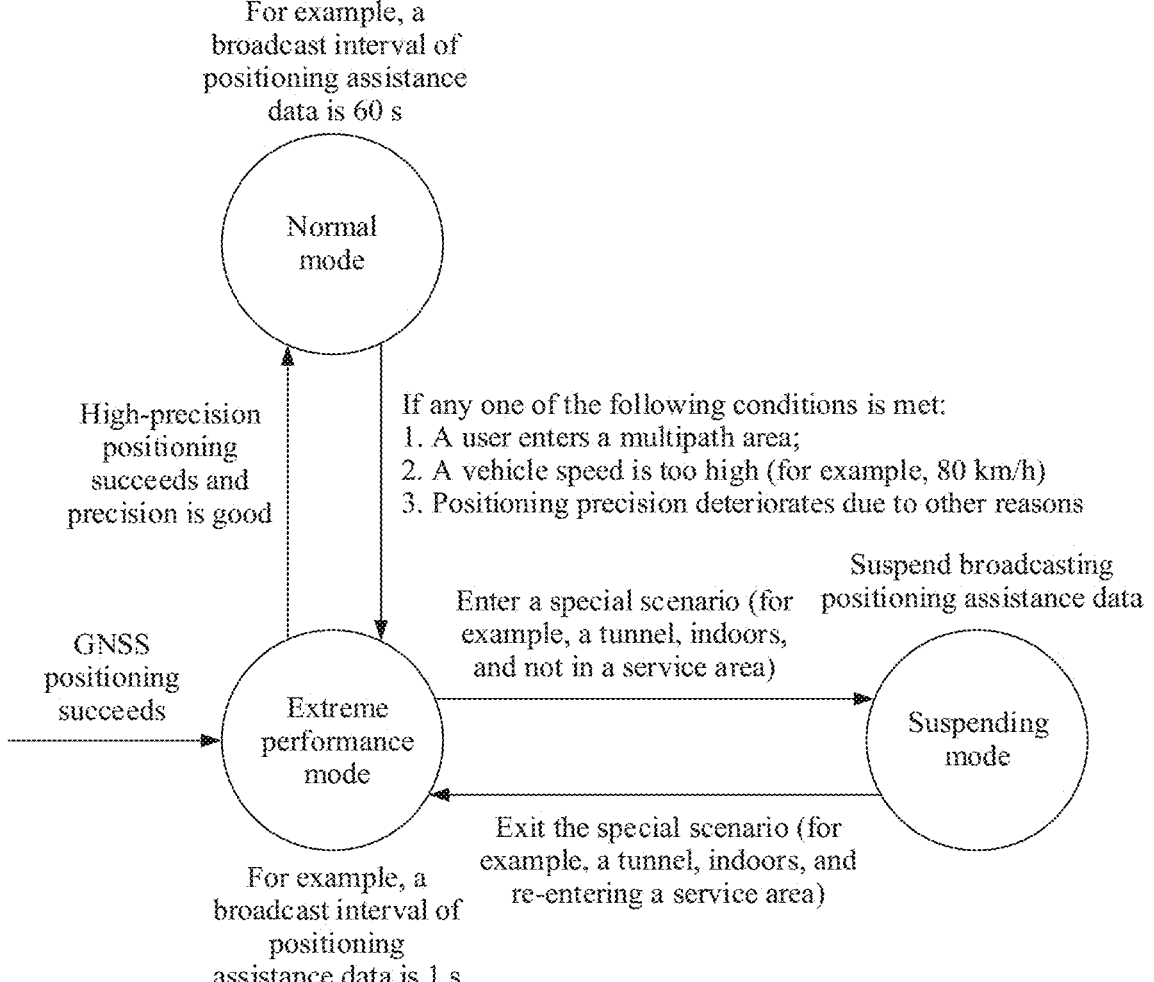
FIG. 10 is a schematic diagram of a process of switching a positioning working mode according to an embodiment of this application.

As shown in FIG. 10, a process of switching between positioning work modes may be as follows:

1. Extreme Performance Mode

When the working mode control module 623 determines, based on a high-precision positioning status, that the electronic device 100 completes common positioning for the first time by using the GNSS chip, and obtains the GNSS position information, the working mode control module 623 may control the electronic device 100 to enter the extreme performance mode for the first time. The extreme performance mode is mainly used in a scenario in which high-precision positioning performance is challenged, for example, initial positioning, re-positioning after positioning loss, high-speed movement of the electronic device 100, and a strict multipath area. If a delay of the positioning assistance data is excessively long, positioning performance of the electronic device 100 may deteriorate. For example, the electronic device 100 performs high-precision positioning for the first time for a relatively long time, and precision is reduced. When the electronic device 100 enters the extreme performance mode, the working mode control module 623 may send, to the network interaction protocol module 624, indication information indicating that the electronic device 100 is in the extreme performance mode. When obtaining the indication information indicating that the electronic device 100 is in the extreme performance mode, the network interaction protocol module 624 may send first setting information to the server 200 by using the wireless communications chip 630, where the first setting information is used to set an interval at which the server 200 broadcasts the positioning assistance data as a first time interval, for example, 1 to 10 seconds. In this way, it can be ensured that high-precision positioning performance of the electronic device 100 has no significant loss.

2. Normal Mode

After the electronic device 100 enters the extreme performance mode, when the working mode control module 623 determines that the electronic device 100 meets a first preset condition, the working mode control module 623 may control the electronic device 100 to enter the normal mode. The first preset condition may include that the electronic device 100 successfully performs high-precision positioning and positioning precision is lower than first preset precision (lower positioning precision indicates a more accurate positioning result). When the electronic device 100 enters the normal mode, the working mode control module 623 may send, to the network interaction protocol module 624, indication information indicating that the electronic device 100 is in the normal mode. When obtaining the indication information indicating that the electronic device 100 is in the normal mode, the network interaction protocol module 624 may send second setting information to the server 200 by using the wireless communications chip 630. The second setting information is used to set an interval at which the server 200 broadcasts the positioning assistance data as a second time interval, for example, 60 seconds. The second time interval is longer than the first time interval. In a possible implementation, the second time interval may be the same as a network connection time interval of an application. For example, if the network connection time interval of the application is 60 s, the second time interval may also be 60 s.

After the electronic device 100 enters the normal mode, when the working mode control module 623 determines, based on the speed information, the environment identification result, the high-precision positioning status, and the like, that the electronic device 100 meets a second preset condition, the working mode control module 623 may control the electronic device 100 to switch to the extreme performance mode. The second preset condition includes any one or more of the following: the electronic device 100 is in a multipath area, a moving speed of the electronic device 100 is greater than a preset speed threshold (for example, 80 km/h), or positioning precision of the electronic device 100 is less than a second preset precision threshold.

3. Suspending Mode

When the working mode control module 623 determines, based on the environment identification result, that the electronic device 100 enters a special scenario, the working mode control module 623 may control the electronic device 100 to enter the suspending mode. The special scenario includes one or more of the following scenarios: inside a tunnel (indoors)and re-entering a service area in which a reference station is located.

When the electronic device 100 enters the suspending mode, the working mode control module 623 may send, to the network interaction protocol module 624, indication information indicating that the electronic device 100 is in the suspending mode. The network interaction protocol mode 624 may send third setting information to the server 200 by using the wireless communications chip 630. The third setting information is used to indicate the server 200 to suspend broadcasting the positioning assistance data. After controlling the electronic device 100 to enter the suspending mode, the working mode control module 623 may control the high-precision resolving module 621 to suspend resolving the high-precision positioning information based on the GNSS location information, the measurement information, and the positioning assistance data. In this way, when the electronic device 100 cannot perform positioning normally, a resolving process of the high-precision positioning resolving module 621 may be suspended, thereby reducing power consumption.

When the electronic device 100 exits the foregoing special scenario, the working mode control module 623 may switch the electronic device 100 from the suspending mode to the foregoing extreme performance mode.

The network interaction protocol module 624 may further obtain the GNSS location information provided by the GNSS chip 640 after the wireless communications chip 630 sends the setting information corresponding to the positioning working mode to the server 200, and send the GNSS location information to the server 200.

The network interaction protocol module 624 may further receive the positioning assistance data broadcast by the server 200 based on the time interval set by the setting information. After receiving the positioning assistance data, the network interaction protocol module 624 may send the positioning assistance data to the high-precision resolving module 621.

In a possible implementation, the wireless communication status monitoring module 625 may monitor a working status of the wireless communications chip 630. When the wireless communication status monitoring module 625 detects that a module (for example, an upper-layer application) other than the network interaction protocol module 624 requests the wireless communications module 630 to send data, the wireless communications status monitoring module 625 may instruct the network interaction protocol module 624 to synchronously send the positioning assistance data to the server 200 by using the wireless communications chip 630. In this way, the wireless communications chip 630 may send data in a centralized manner, so that the wireless communications chip 630 can quickly enter a sleep state after sending the data in a centralized manner, thereby reducing power consumption of the electronic device 100.

The following describes a schematic flowchart of a low-power-consumption positioning method according to an embodiment of this application.

In some application scenarios, when the electronic device 100 completes common positioning by using the GNSS chip for the first time, and obtains the GNSS location information, the electronic device 100 may enter the extreme performance mode, and send the first setting information to the server 200, where the first setting information is used to indicate the server 200 to broadcast the positioning assistance data to the electronic device 100 at the first time interval (for example, one second). When the high-precision positioning succeeds and the positioning precision is lower than the first preset precision (a lower positioning precision indicates a more accurate positioning result), the electronic device 100 may enter the normal mode, and send the second setting information to the server 200. The second setting information is used to indicate the server 200 to broadcast the positioning assistance data to the electronic device 100 at the second time interval (for example, 60 seconds). The first time interval is shorter than the second time interval. In this way, the electronic device 100 can prolong an interval for requesting the positioning assistance data as much as possible while ensuring high-precision positioning performance, thereby reducing power consumption of the electronic device 100.

Figure 11A:
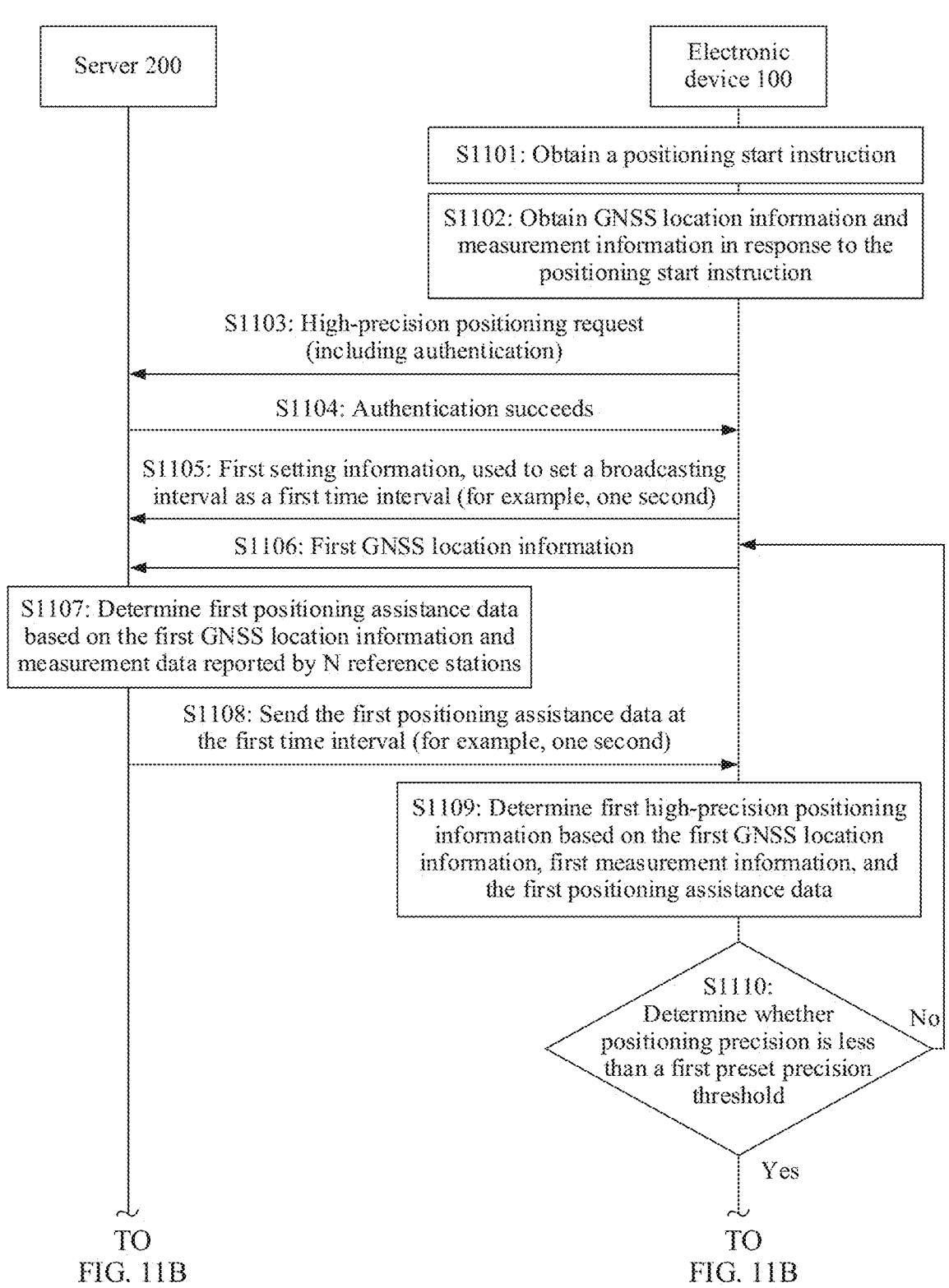

FIG. 11A to FIG. 11C show a schematic flowchart of a low-power-consumption positioning method according to an embodiment of this application. A server 200 may obtain, in real time, measurement data reported by N reference stations.

As shown in FIG. 11A to FIG. 11C, the method includes the following steps.

S1101: An electronic device 100 obtains a positioning start instruction.

The electronic device 100 may obtain a positioning start instruction of an upper-layer application (for example, a navigation application). For example, the electronic device 100 may receive input (for example, a tap) of the user for a navigation start control in an interface of a navigation application, and in response to the input, the electronic device 100 may obtain a positioning start instruction delivered by the navigation application. For another example, the electronic device 100 may receive voice input of a user. When the electronic device 100 detects that the voice input by the user includes a voice instruction used to start positioning (for example, "enable navigation"), the electronic device 100 may start a navigation application in response to the voice input, and enable a positioning function in the navigation application. in this case, the electronic device 100 may obtain a positioning start instruction delivered by the navigation application.

S1102: The electronic device 100 may obtain GNSS location information and measurement information by using a GNSS chip in response to the positioning start instruction.

The GNSS location information may be a probability location calculated based on a pseudo-range single point or in another manner. The measurement information includes one or more of a pseudo range, a carrier phase, a Doppler frequency, and the like.

The electronic device 100 may further obtain GNSS signal status information by using the GNSS chip. The GNSS signal status information includes a quantity of satellite signals found by the electronic device 100, signal intensity of each satellite signal, a quantity of visible satellites (satellites whose signal intensity is greater than a third signal intensity threshold (for example, 25 dB-Hz), satellite geometric distribution, a quantity of multipath satellites (satellites having a multipath effect), and the like. The electronic device 100 may determine, based on the GNSS signal status, an environment in which the electronic device 100 is located. For example, the electronic device 100 may determine, based on a GNSS signal status, whether the electronic device 100 is in a tunnel/indoors, a multipath area, an open area, an area under an elevated road, or the like.

S1103: After obtaining the GNSSS location information and the measurement information, the electronic device 100 may send a high-precision positioning request to a server 200. The high-precision positioning request includes authentication information.

S1104: The server 200 completes authentication on the electronic device 100.

The authentication information may include location service account information on the electronic device 100. After receiving the high-precision positioning request sent by the electronic device 100, the server 200 may determine whether the positioning service account information of the electronic device 100 has permission to obtain positioning assistance data. When the server 200 determines that the positioning service account information of the electronic device 100 has the permission to obtain the positioning assistance data, the server 200 completes authentication on the electronic device 100.

In a possible implementation, the authentication information may be a device model of the electronic device 100. In this way, the server 200 can allow devices of a same device model to obtain the positioning assistance data.

S1105: The electronic device 100 sends first setting information to the server 200. where the first setting information is used to set an interval at which the server 200 broadcasts the positioning assistance data as a first time interval (for example, one second).

When the electronic device 100 completes common positioning for the first time by using the GNSS chip, and obtains first GNSS location information for the first time, the electronic device 100 may enter an extreme performance mode. In the extreme performance mode, the electronic device 100 may send the first setting information to the server 200, where the first setting information is used to set the interval at which the server 200 broadcasts the positioning assistance data to be the first time interval (for example, one second).

S1106: The electronic device 100 sends the first GNSS location information to the server 200.

Because the electronic device 100 periodically obtains GNSS location information by using the GNSS chip, the electronic device 100 may periodically send the GNSS location information (including the first GNSS location information, and second GNSS location information and third GNSS location information in subsequent embodiments) to the server 200.

In the extreme performance mode, the electronic device 100 needs to frequently obtain precise location information, and therefore the electronic device 100 may send the first GNSS location information to the server 200 in a first period (for example, 3 seconds).

S1107: The server 200 determines first positioning assistance data based on the first GNSS location information and measurement data reported by N reference stations.

The server 200 may determine the first positioning assistance data in the first time interval based on the first GNSS location information and the measurement data reported by the N reference stations.

For example, a time interval at which the N reference stations report the measurement data to the server 200 may be 1 s. The first time interval may be 1 s. After receiving the first GNSS location information, the server 200 may determine, at an interval of 1 s, the first positioning assistance data based on the first GNSS location information and the measurement data reported by the N reference stations.

In this embodiment of this application, for a process in which the server 200 determines the first positioning assistance data, refer to the embodiment shown in FIG. 6. Details are not described herein again.

S1108: The server 200 sends the first positioning assistance data to the electronic device 100 at the first time interval (for example, one second).

S1109: The electronic device 100 determines first high-precision positioning information based on the first GNSS location information, first measurement information, and the first positioning assistance data.

In this embodiment of this application, for a process in which the electronic device 100 determines the first high-precision positioning information, refer to the embodiment shown in FIG. 6. Details are not described herein again.

S1110: The electronic device 100 determines Whether positioning precision is less than a first preset precision threshold. If the positioning precision is less than the first preset precision threshold, S1111 is performed, and the electronic device 100 sends second setting information to the server 200. The second setting information is used to set an interval at which the server 200 broadcasts the positioning assistance data as a second time interval (for example, 60 seconds).

That the positioning precision of the electronic device 100 is less than the first preset precision threshold may be referred to as a first preset condition. The second time interval is longer than the first time interval. The electronic device 100 may further calculate positioning precision while resolving high-precision positioning information based on the GNSS location information, the measurement information, and the positioning assistance data. For example, the electronic device 100 calculates the high-precision positioning information based on the GNSS location information, the measurement information, and the positioning assistance data by using a Kalman (Kalman) filter. A covariance matrix of the Kalman filter may be used to provide an estimated positioning accuracy value.

The electronic device 100 may periodically (for example, a period is 10 s) determine whether the positioning precision is less than first preset precision. A smaller value of the positioning precision indicates a more accurate positioning result. A unit of the positioning precision can be circular error probable (circular error probable, CEP), a root mean square (root mean square, RMS), or 2DRMS (2DRMS). For example, when the positioning precision is represented by the CEP, the first preset precision may be 0.1 in (CEP), indicating that a probability that a distance between the high-precision positioning result and an accurate location is less than 0.1 m is 50%. Alternatively, the first preset precision may be 0.12 m (RMS), indicating a probability that a distance between a high-precision positioning result and an accurate location is less than 0.12 m is a 67%. Alternatively, the first preset precision may be 0.24 m (2DRMS), indicating a probability that a distance between a high-precision positioning result and an accurate location is less than 0.24 m is a 95%.

In a possible implementation, when the electronic device 100 determines that the positioning precision is greater than or equal to the first preset precision, the electronic device 100 may not send the second setting information to the server 200. The server 200 may continue to send the first positioning assistance data to the electronic device 100 at the first time interval.

S1112: The electronic device 100 sends the second GNSS location information to the server 200.

When the electronic device 100 successfully resolves the first high-precision positioning information, and determines that the positioning precision is less than the first preset precision, the electronic device 100 may enter the normal mode. In the normal mode, the electronic device 100 does not need to frequently obtain precise location information as in the extreme performance mode, and the electronic device 100 may send the second GNSS location information to the server 200 in a second period (for example, 60 s). The first period is longer than the second period.

In a possible implementation, the wireless communications chip on the electronic device 100 enters a sleep state when no data is transmitted for a period of time (for example, 10 seconds), to reduce power consumption. When an upper-layer application or another module has a data service, the electronic device 100 may wake up the wireless communications chip, and send data to a network by using the wireless communications chip. After obtaining the second GNSS location information by using the GNSS chip, the electronic device 100 may detect a time at which another application or module wakes up the wireless communications chip to send data. The electronic device 100 may send the second LASS location information to the server 200 when sending other data. In this way, the wireless communications chip can send data in a centralized manner, so that the wireless communications chip 630 can quickly enter a sleep state after sending the data in a centralized manner, thereby reducing power consumption of the electronic device 100.

S1113: The server 200 determines second positioning assistance data based on the second GLASS location information and the measurement data reported by the N reference stations.

The server 200 may determine the second positioning assistance data at the second time interval based on the second GNSS location information and the measurement data reported by the N reference stations.

For example, a time interval at which the N reference stations report the measurement data to the server 200 may be one s. The second time interval may be 60 s. After receiving the second GNSS location information, the server 200 may determine the second positioning assistance data every 60 s based on the second GNSS location information and the measurement data reported by the N reference stations.

S1114: The server 200 sends the second positioning assistance data to the electronic device 100 at the second time interval (for example, 60 s).

The second time interval is longer than the first time interval.

S1115: The electronic device 100 determines second high-precision positioning information based on the second GNSS location information, second measurement information, and the second positioning assistance data.

In this embodiment of this application, for a process in which the electronic device 100 determines the second high-precision positioning information, refer to the embodiment shown in FIG. 6. Details are not described herein again.

S1116: The electronic device 100 determines whether the electronic device 100 meets a second preset condition. If the electronic device 100 meets the second preset condition. S1117 is performed. The electronic device 100 sends the first setting information to the server 200, where the first setting information is used to set a time interval at which the server broadcasts positioning assistance data as the first time interval (for example, one second).

The second preset condition includes any one or more of the following: the electronic device 100 is in a multipath area, a moving speed of the electronic device 100 is greater than a preset speed threshold (for example, 80 km/h), and positioning precision of the electronic device 100 is greater than a second preset precision threshold. Lower positioning precision of the electronic device 100 indicates more accurate positioning of the electronic device 100.

In this embodiment of this application, for a procedure in which the electronic device 100 determines whether the electronic device 100 meets the second preset condition, refer to the embodiment shown in FIG. 6. Details are not described herein again.

S1118: The electronic device 100 sends third GNSS location information to the server 200.

S1119: The server 200 determines third positioning assistance data based on the third GNSS location information and the measurement data reported by the N reference stations.

The server 200 may determine the third positioning assistance data at the first time interval (for example, 1 s) based on the third. GNSS location information and the measurement data reported by the N reference stations.

In this embodiment of this application, for a process in which the server 200 determines the third positioning assistance data, refer to the embodiment shown in FIG. 6. Details are not described herein again.

S1120: The server 200 sends the third positioning assistance data to the electronic device 100 at the first time interval (for example, one second).

S1121: The electronic device 100 determines third high-precision positioning information based on the third GNSS location information, third measurement information, and the third positioning assistance data.

In this embodiment of this application, for a process in which the electronic device 100 determines the third high-precision positioning information, refer to the embodiment shown in FIG. 6. Details are not described herein again.

S1122: The electronic device 100 obtains a positioning end instruction.

The electronic device 100 may obtain a positioning end instruction of an upper-layer application (for example, a navigation application). For example, when the electronic device 100 may receive input (for example, a tap) of a user for a navigation end control in an interface of the navigation application, the electronic device 100 may obtain, in response to the input, a positioning end instruction delivered by the navigation application. For another example, the electronic device 100 may receive voice input of a user. When the electronic device 100 detects that the voice input by the user includes a voice instruction used to disable positioning (for example, "end navigation"), the electronic device 100 may disable a positioning function in response to the voice input. In this case, the electronic device 100 may obtain a positioning end instruction delivered by the navigation application. For another example, when a navigation application of the electronic device 100 detects that the electronic device 100 reaches a destination, the electronic device 100 may obtain a positioning end instruction delivered by the navigation application.

S1123: The electronic device 100 sends a positioning end request to the server 200 in response to the positioning end instruction.

The electronic device 100 may further stop, in response to the positioning end instruction, sending GNSS location information to the server 200. The electronic device 100 may further stop, in response to the positioning end instruction, obtaining the GNSS location information by using the GNSS chip, and disable the GNSS chip.

S1124: After receiving the positioning end request, the server 200 stops generating positioning assistance data for the electronic device 100 in response to the positioning end request.

When stopping delivering the positioning assistance to the electronic device 100, the server 200 also stops delivering the positioning assistance data to the electronic device 100.

The following describes a schematic flowchart of a low-power-consumption positioning method according to an embodiment of this application.

In some application scenarios, when the electronic device 100 completes common positioning by using the GNSS chip for the first time, and obtains the GNSS location information, the electronic device 100 may enter the extreme performance mode, and send the first setting information to the server 200, where the first setting information is used to indicate the server 200 to broadcast the positioning assistance data to the electronic device 100 at the first time interval (for example, one second). When the electronic device 100 enters a special scenario (for example, entering a tunnel, being indoors, or not in a service area in which a reference station is located), the electronic device 100 may enter the suspending mode, and send third setting information to the server 200, where the third setting information is used to indicate the server 200 to suspend broadcasting the positioning assistance data to the electronic device 100. In this way, when the electronic device 100 cannot obtain high-precision location information in a special scenario, the server 200 may be enabled to suspend broadcasting the positioning assistance data, and the electronic device 100 suspends requesting and receiving the positioning assistance data. In this way, power consumption of the electronic device 100 can be reduced.

Figure 12A:
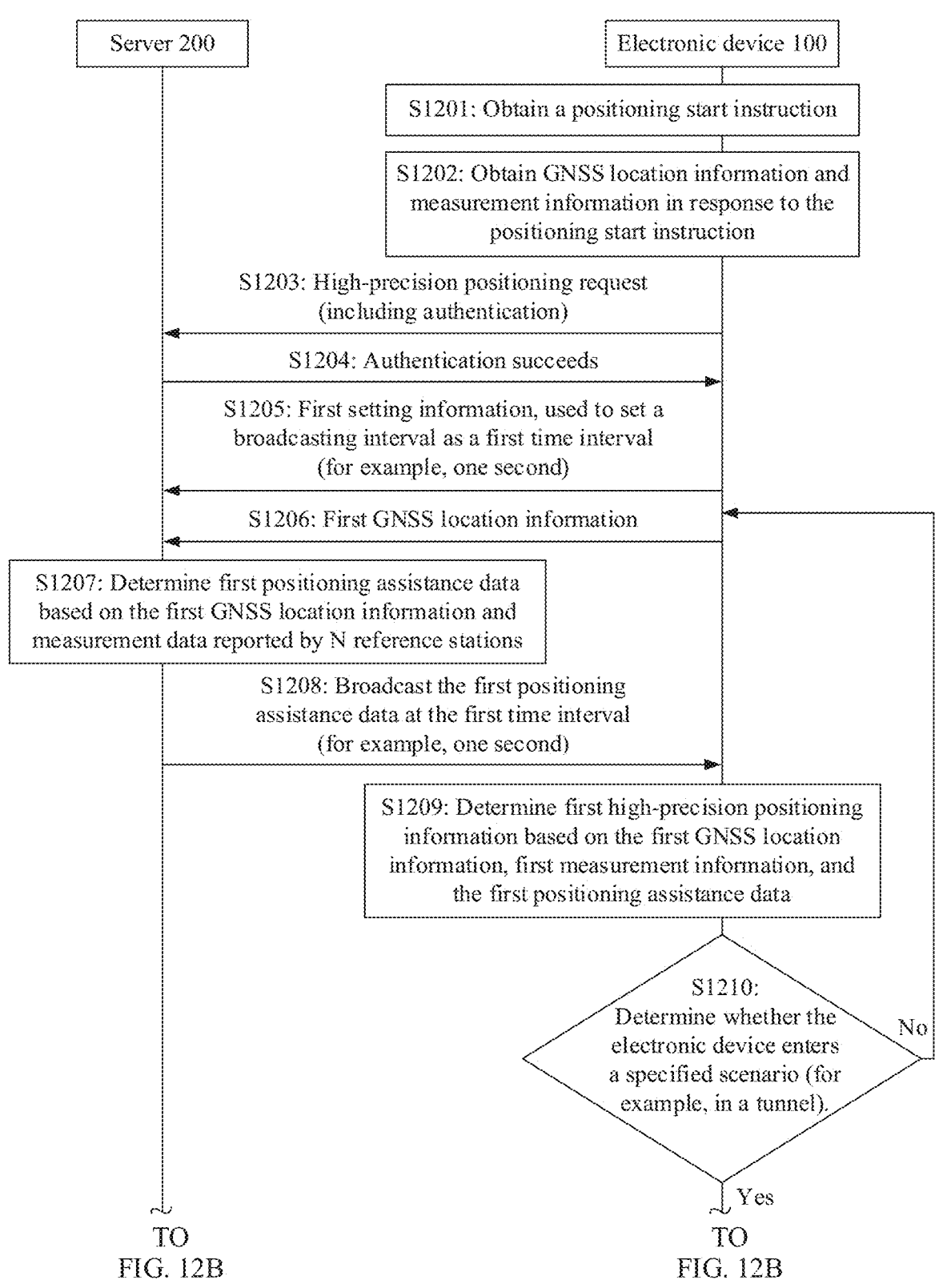
FIG. 12A and FIG. 12B are a schematic flowchart of a low-power-consumption positioning method according to another embodiment of this application.
Figure 12B:
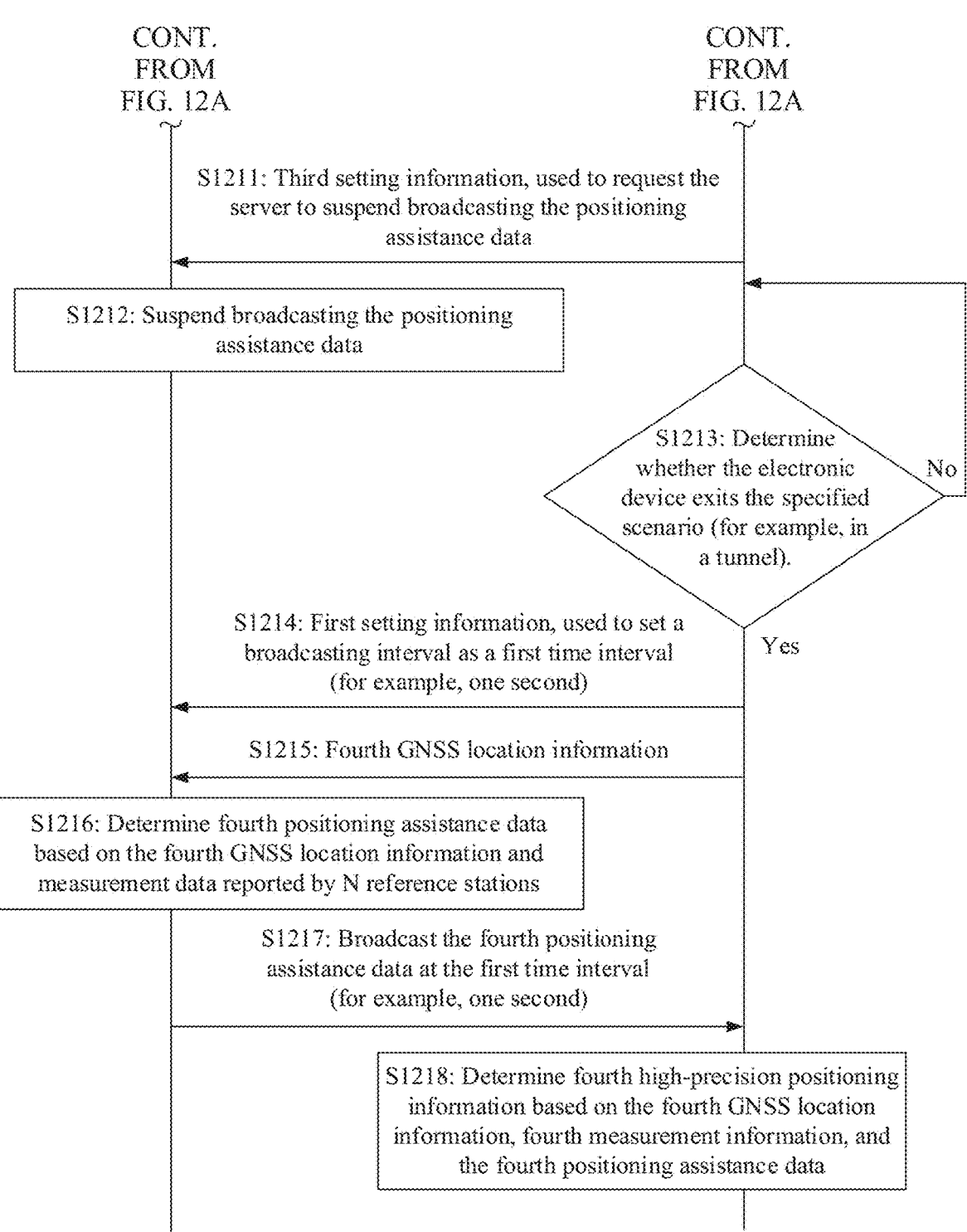

FIG. 12A and FIG. 12B show a schematic flowchart of a low-power-consumption positioning method according to an embodiment of this application.

As shown in FIG. 12A and FIG. 12B, the method includes the following steps.

S1201: An electronic device 100 obtains a positioning start instruction.

For specific content, refer to step S1101 in the foregoing embodiment shown in FIG. 11A. Details are not described herein again.

S1202: The electronic device 100 obtains GNSS location information and measurement information by using a GNSS chip in response to the positioning start instruction.

For specific content, refer to step S1102 in the foregoing embodiment shown in FIG. 11A. Details are not described herein again.

S1203: The electronic device 100 sends a high-precision positioning request to a server 200. The high-precision positioning request includes authentication information.

For specific content, refer to step S1103 in the foregoing embodiment shown in FIG. 11A. Details are not described herein again.

S1204: The server 200 completes authentication on the electronic device 100.

For specific content, refer to step S1104 in the foregoing embodiment shown in FIG. 11A. Details are not described herein again.

S1205: The electronic device 100 sends first setting information to the server 200, where the first setting information is used to set an interval at which the server 200 broadcasts positioning assistance data as a first time interval (for example, one second).

For specific content, refer to step S1105 in the foregoing embodiment shown in FIG. 11A. Details are not described herein again.

S1206: The electronic device 100 sends first GNSS location information to the server 200.

For specific content, refer to step S1106 in the foregoing embodiment shown in FIG. 11A. Details are not described herein again.

S1207: The server 200 determines first positioning assistance data based on the first GNSS location information.

For specific content, refer to step S1107 in the foregoing embodiment shown in FIG. 11A. Details are not described herein again.

S1208: The server 200 sends the first positioning assistance data to the electronic device 100 at the first time interval.

For specific content, refer to step S1108 in the foregoing embodiment shown in FIG. 11A. Details are not described herein again.

S1209: The electronic device 100 determines first high-precision positioning information based on the first GNSS location information, first measurement information, and the first positioning assistance data.

For specific content, refer to step S1109 in the foregoing embodiment shown in FIG. 11A. Details are not described herein again.

S1210: The electronic device 100 determines whether the electronic device 100 enters a specified scenario (for example, in a tunnel (indoors)). If the electronic device 100 enters the specified scenario, step S1211 is performed. The electronic device 100 sends third setting information to the server 200, where the third setting information is used to request the server 200 to suspend broadcasting the positioning assistance data to the electronic device 100.

Specifically, for a process in which the electronic device 100 determines whether the electronic device 100 enters the specified scenario, refer to the example shown in FIG. 7. Details are not described herein again.

After the electronic device 100 sends the third setting information to the server 200, the electronic device 100 may suspend sending the GNSS location information to the server 200.

S1212: The server 200 suspends, in response to the third setting information, broadcasting the positioning assistance data to the electronic device 100.

Specifically, in response to the third setting information, the server 200 may suspend generating the positioning assistance data, and suspend broadcasting the positioning assistance data to the electronic device 100.

S1213: The electronic device 100 determines whether the electronic device 100 exits the specified scenario (for example, entering a tunnel, entering an indoor area, or not in a service area in which a reference station is located). If the electronic device 100 exits the specified scenario, S1214 is performed. The electronic device 100 sends the first setting information to the server 200, where the first setting information is used to set the interval at which the server 200 broadcasts the positioning assistance data as the first time interval (for example, one second).

Specifically, for a process in which the electronic device 100 determines whether the electronic device 100 exits the specified scenario (for example, exiting a tunnel, being indoors, or entering a service area in which a reference station is located), refer to the example shown in FIG. 7. Details are not described herein again.

S1215: The electronic device 100 sends fourth GNSS location information to the server 200.

After it is determined that the electronic device 100 exits the specified scenario (for example, exits a tunnel, is indoors, or enters a service area in which a reference station is located), the electronic device 100 may be in an extreme performance mode. After sending the first setting information to the server 200, the electronic device 100 may send the fourth GNSS location information to the server 200 at the first time interval (for example, one second).

S1216: The server 200 determines fourth positioning assistance data based on the fourth GNSS location information and measurement data reported by N reference stations.

In this embodiment of this application, for a process in which the server 200 determines the fourth positioning assistance data, refer to the embodiment shown in FIG. 6. Details are not described herein again.

S1217: The server 200 broadcasts the fourth positioning assistance data to the electronic device 100 at the first time interval.

S1218: The electronic device 100 determines fourth high-precision positioning information based on the fourth GNSS location information, fourth measurement information, and the positioning assistance data.

In this embodiment of this application, for a process in which the electronic device 100 determines the first high-precision positioning information, refer to the embodiment shown in FIG. 6. Details are not described herein again.

In this embodiment of this application, the embodiment shown in FIG. 11A to FIG. 11C and the embodiment shown in FIG. 12A and FIG. 12B may be combined for implementation. For a specific combination relationship, refer to the embodiment shown in FIG. 10. Details are not described herein again.

In some application scenarios, after receiving a user input to start navigation, the electronic device 100 may obtain positioning assistance data from the server 200 at the first time interval (for example, one second), and resolve a high-precision positioning result with reference to GNSS location and measurement information that are obtained by using a. GNSS chip. When the high-precision positioning result is successfully resolved and a positioning result is accurate, the electronic device 100 may obtain the positioning assistance data from the server 200 at a second time interval (for example, 60 seconds), and resolve the high-precision positioning result with reference to the GNSS location information and the measurement information that are obtained by using the GNSS chip. Afterward, if the electronic device 100 meets a second preset condition (for example, a moving speed exceeds 90 km/h, entering a multipath area, or positioning accuracy is reduced), the electronic device 100 may obtain the positioning assistance data at the first time interval (for example, one second), and resolve the high-precision positioning result with reference to the GNSS location information and the measurement information that are obtained by using the GNSS chip. If the electronic device 100 enters a tunnel (or is indoors) or is not in a service area in which a reference station is located, the electronic device 100 may suspend obtaining the positioning assistance data from the server 200, and does not resolve the high-precision positioning result. If the electronic device 100 leaves the tunnel (or is outdoors) or re-enters the service area in which the reference station is located, the electronic device 100 may obtain the positioning assistance data from the server 200 at the first time interval, and resolve the high-precision positioning result with reference to the GNSS location information and the measurement information that are obtained by using the GNSS chip. In this way, the electronic device 100 can prolong an interval for requesting the positioning assistance data as much as possible while ensuring high-precision positioning performance, thereby reducing power consumption of the electronic device 100.

Figure 13A:
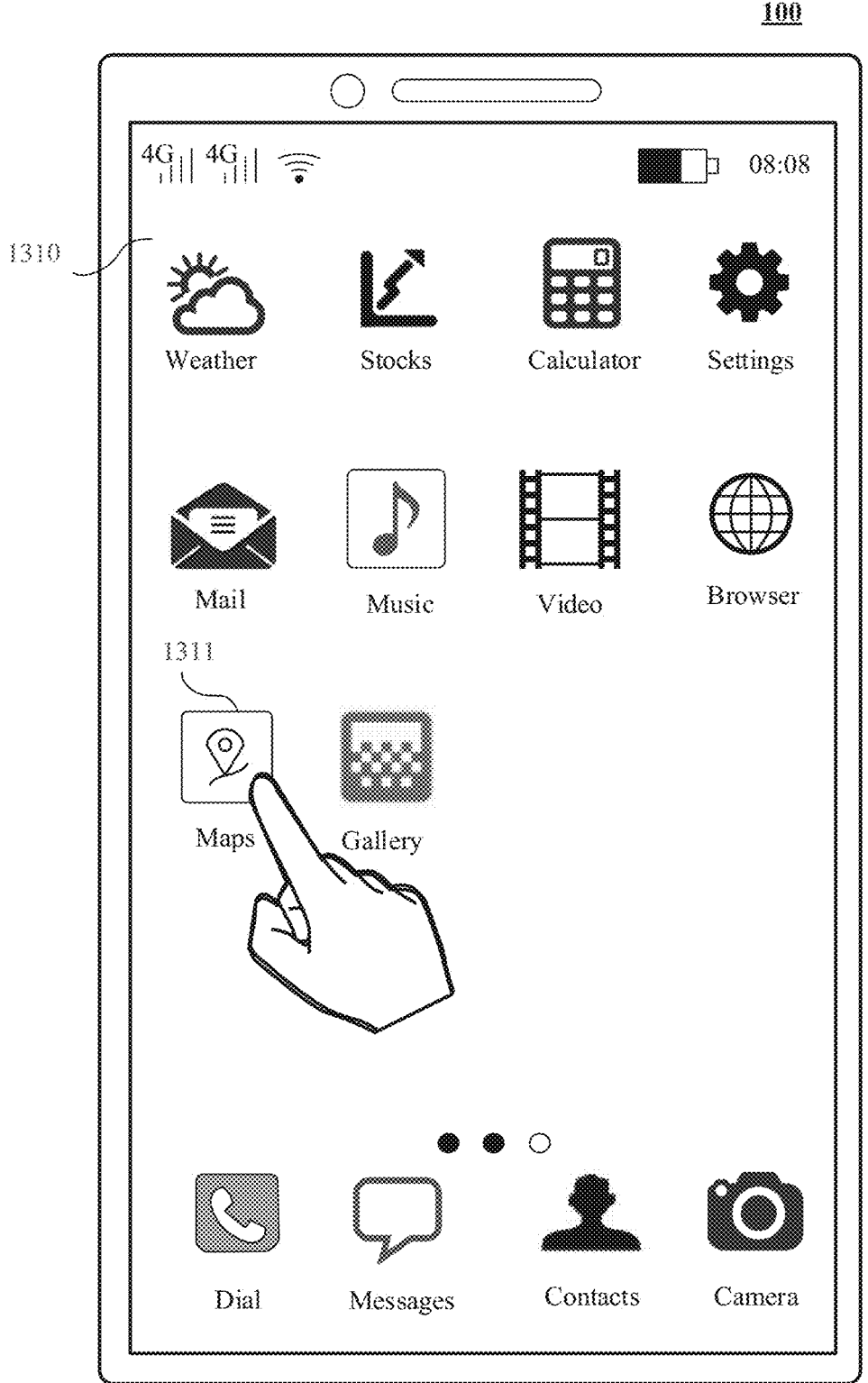
FIG. 13A to FIG. 13J are schematic diagrams of a group of interfaces according to an embodiment of this application.

For example, as shown in FIG. 13A, the electronic device 100 may display an interface 1310 of a home screen (home screen). The interface 1310 displays a page on which application icons are placed. The page includes a plurality of application icons (for example, a weather application icon, a stock application icon, a calculator application icon, a settings application icon, an email application icon, a music application icon, a video application icon, a browser application icon, a map application icon 1311, a gallery application icon, a memo application icon, and a voice assistant application icon). Optionally, a page indicator is further displayed below the plurality of application icons, to indicate a total quantity of pages on the home screen and a position relationship between a currently displayed page and another page. For example, the interface 1310 of the home screen may include three pages, and a white dot in the page indicator may indicate that the currently displayed page is a rightmost page of the three pages. There are a plurality of tray icons (for example, a dial application icon, a message application icon, a contact application icon, and a camera application icon) below the page indicator, and the tray icons remain displayed during page switching.

The electronic device 100 may receive an input operation (for example, a tap) of the user on the map application icon 1311. In response to the input operation, the electronic device 100 may display a map application interface 1320 shown in FIG. 13B.

Figure 13B:
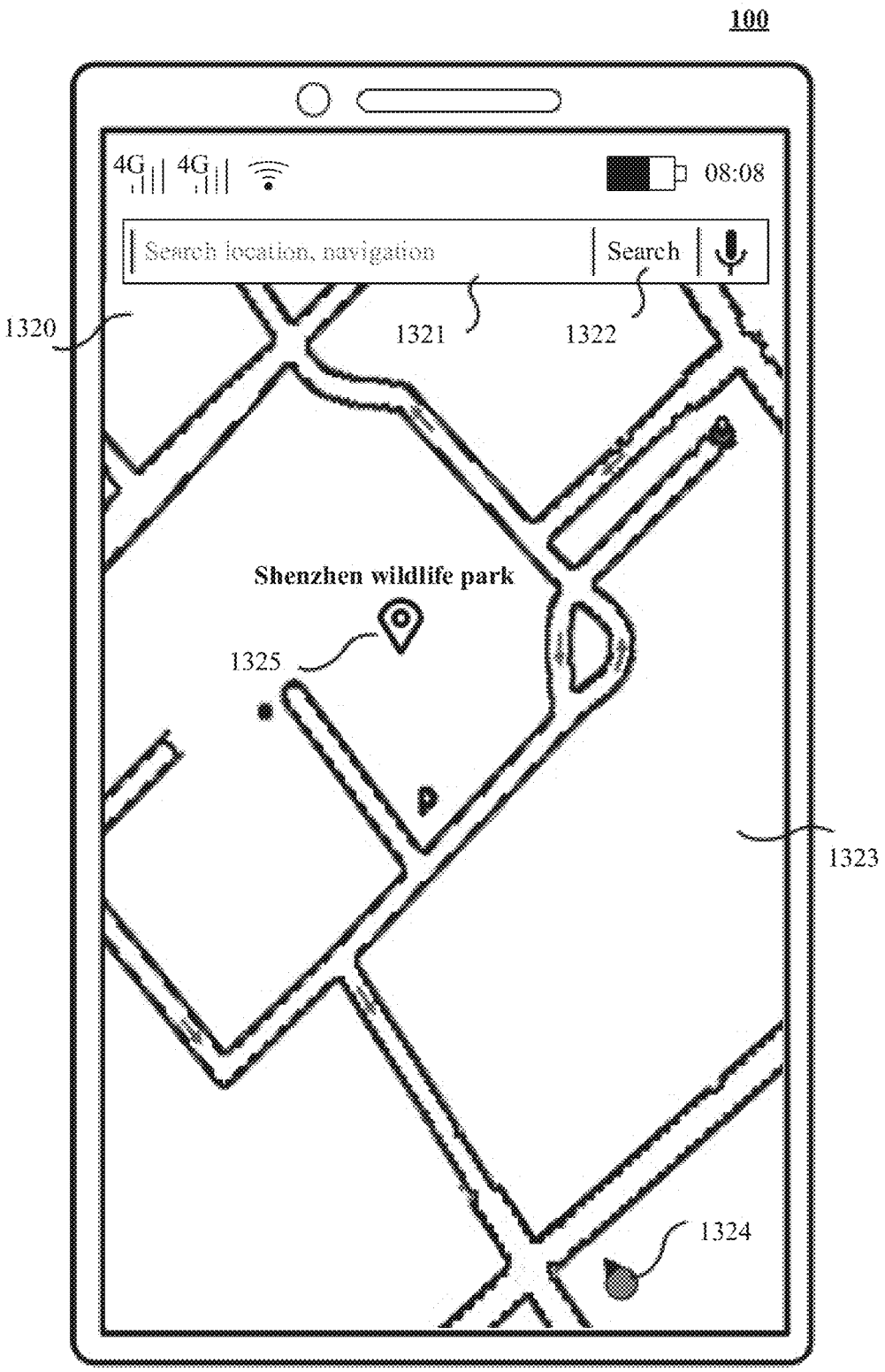

As shown in FIG. 13B, the map application interface 1320 may include an address search input box 1321, a search control 1322, a map 1323, and a location mark 1324 of the electronic device 100 in the map 1323. The address search input box 1321 may be configured to receive an address name input by the user. The search control 1322 may be configured to trigger the electronic device 100 to display location information that is input by the user and that corresponds to the address name.

The electronic device 100 may receive an address name (for example, "Shenzhen wildlife park") input by the user in the address search input box 1321. Then, the electronic device 100 may receive an input operation (for example, a tap) of the user on the search control 1322. In response to the input operation, the electronic device 100 may display, on the map 1323, a location mark corresponding to the address name and the location information corresponding to the address name.

Figure 13C:
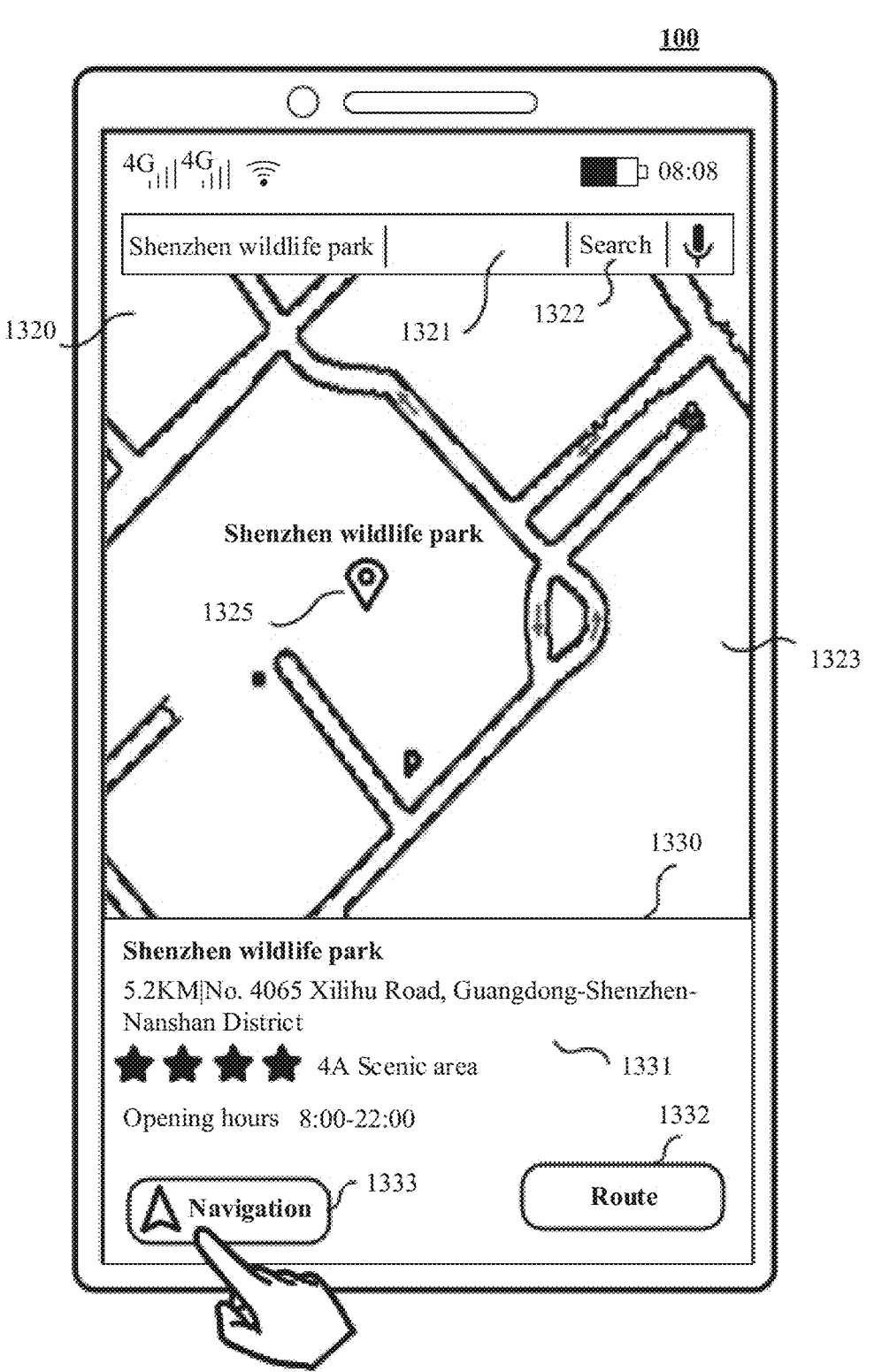

Specifically, as shown in FIG. 13C, after the electronic device 100 receives an address name (for example, "Shenzhen wildlife park") input by the user and searches for the location information corresponding to the address name, the electronic device 100 may display, on the map 1323, a location mark 1325 corresponding to the address name and a details page 1330 corresponding to the address name. The details page 1330 of the address name includes location information 1331 (for example, "No. 4065, Xilihu Road, Nanshan District, Guangdong Province"), a route control 1332, a navigation control 1333, and the like that correspond to the address name. The route control 1332 may be configured to trigger the electronic device 100 to display information about a route from a location of the electronic device 100 to a location corresponding to the address name. The navigation control 1333 may be configured to trigger the electronic device 100 to display navigation information from the location of the electronic device 100 to the address name.

Figure 13D:
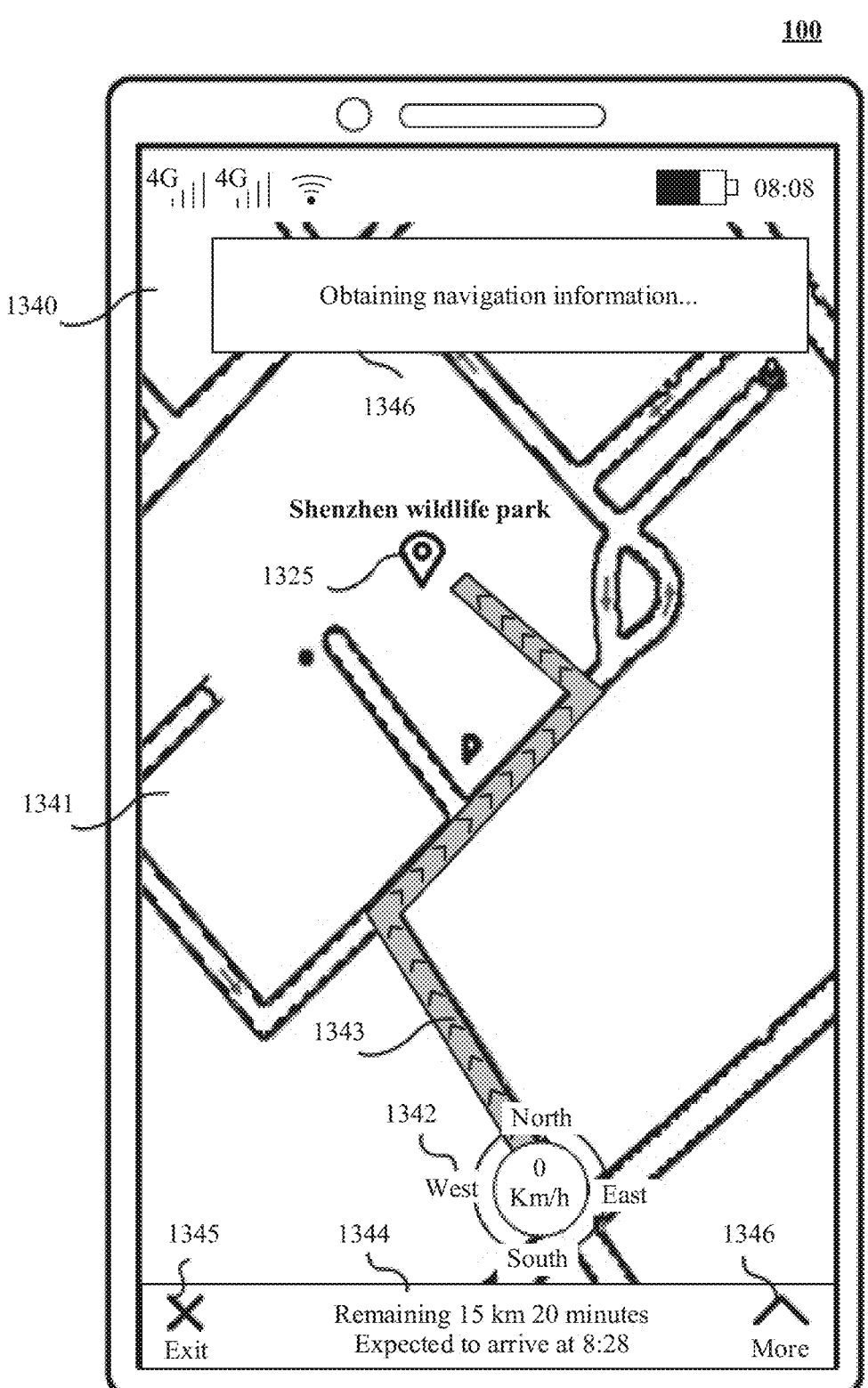

The electronic device 100 may receive an input operation (for example, a tap) performed by the user on the navigation control 1333, and display, in response to the input operation, a navigation interface 1340 shown in FIG. 13D. The electronic device 100 may further obtain GNSS location information and measurement information by using a GNSS chip in response to the input operation on the navigation control 1333, and send a high-precision positioning request and first setting information to a server 200. The first setting information is used to set a time interval at which the server 200 broadcasts positioning assistance data as a first time interval (for example, 1 s). In this case, after sending the first setting information to the server 200, the electronic device 100 may enter an extreme performance mode. When the electronic device 100 is in the extreme performance mode, the electronic device 100 may receive the positioning assistance data sent by the server 200 at the first time interval. The electronic device 100 may determine high-precision positioning information based on the obtained GNSS location information, the obtained measurement information, and the obtained positioning assistance data. The electronic device 100 may determine, based on the high-precision positioning information and map information, navigation information displayed on a navigation interface 1340. The navigation information includes route information, speed information of the electronic device 100, lane information, and the like.

As shown in FIG. 13D, the navigation interface 1340 may include a map 1341, a location mark 1342, a location mark 1325, a route 1343, distance and time information 1344, an exit control 1345, a more control 1346, and the like. The location mark 1342 is used to indicate a location of the electronic device 100 on the map 1341. The location mark 1342 may display speed information (for example, "0 km/h" in this case) of the electronic device 100. The location marker 1325 may be used to indicate a location of a destination (for example, "Shenzhen wildlife park") in the map 1341. The route 1343 may be used to indicate information about a route from a location of the electronic device 100 to the destination. The distance and time information 1344 is used to indicate a distance (for example, "Remaining 15 km") from the electronic device 100 to the destination and an estimated time (for example, "expected to arrive at 8:28") for arriving at the destination. The exit control 13456 may be configured to trigger the electronic device 100 to end navigation. The more control 1346 may be configured to trigger the electronic device 100 to display more navigation-related function controls. The electronic device 100 may further display prompt information 1346 on the navigation interface 1340. The prompt information 1346 is used to prompt the user that the electronic device 100 is determining, based on the first high-precision positioning information and the map information, the navigation information displayed on the navigation interface 1340.

Figure 13E:
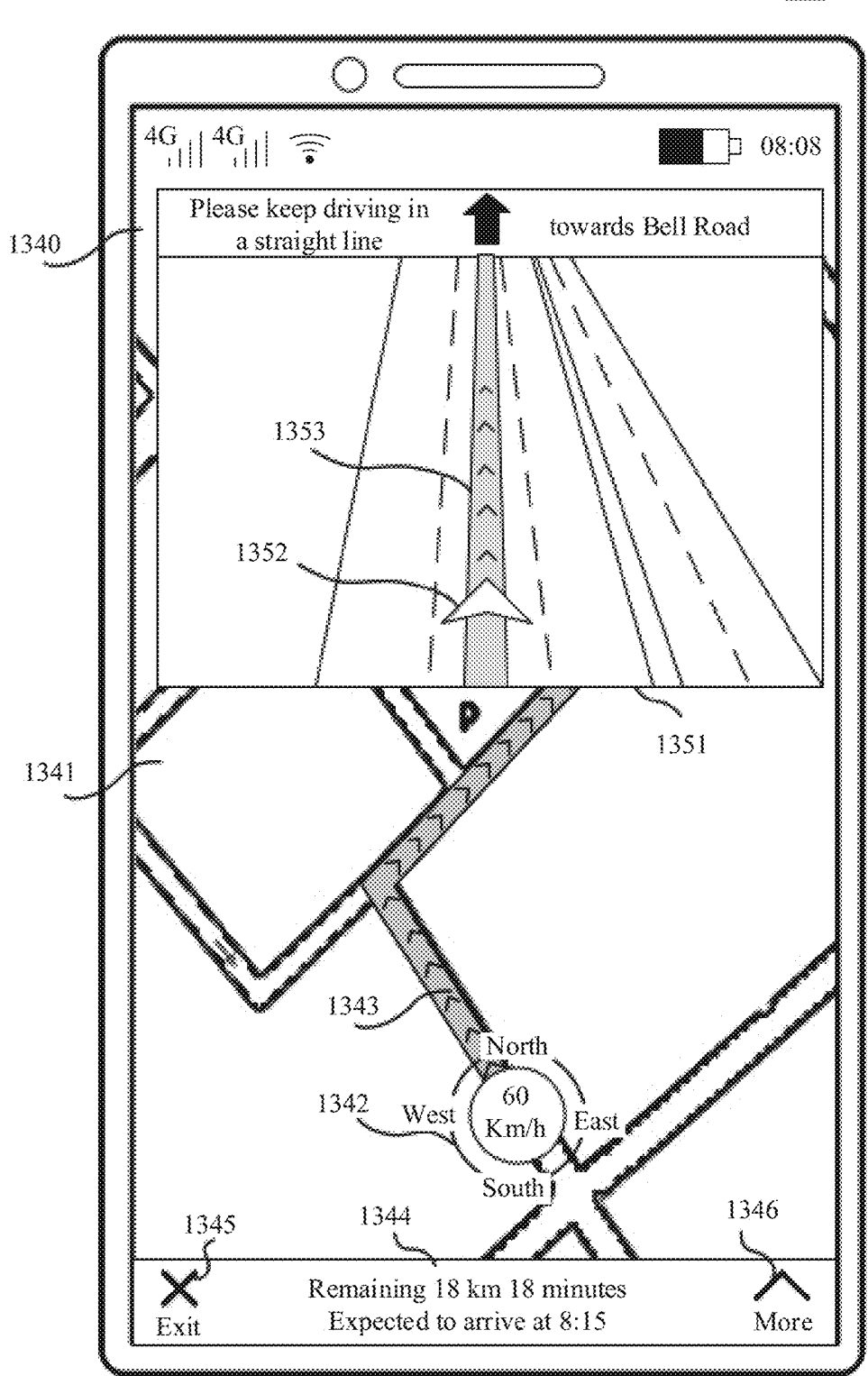

As shown in FIG. 13E, after determining the navigation information, the electronic device 100 may display a navigation prompt box 1351 on the navigation interface 1340. The navigation information is displayed in the navigation prompt box 1351. The navigation information includes a lane 1352 in which the electronic device 100 is located, lane route information 1353, and a driving direction (for example, "Please keep going straight, to a direction of Bell Road").

After displaying the navigation information, the electronic device 100 may send second setting information to the server 200 when positioning precision of the electronic device 100 is less than first preset precision. The second setting information may be used to set a time interval at which the server 200 broadcasts the positioning assistance data as a second time interval (for example, 60 s), where the second time interval is longer than the first time interval. After sending the second selling information to the server 200, the electronic device 100 may enter a normal mode. When the electronic device 100 is in the normal mode, the electronic device 100 may receive the positioning assistance data sent by the server 200 at the second time interval. Lower positioning precision indicates more accurate positioning.

When the electronic device 100 determines that the electronic device 100 meets a second preset condition, the electronic device 100 may send the first selling information to the server 200 and switch to the extreme performance mode, where the first setting information is used to set the time interval at Which the server 200 broadcasts the positioning assistance data as the first time interval (for example, 1 s). The second preset condition includes any one or more of the following: the electronic device 100 is in a multipath area, a moving speed of the electronic device 100 is greater than a preset speed threshold (for example, 80 km/h), or positioning precision of the electronic device 100 is less than a second preset precision threshold.

Figure 13F:
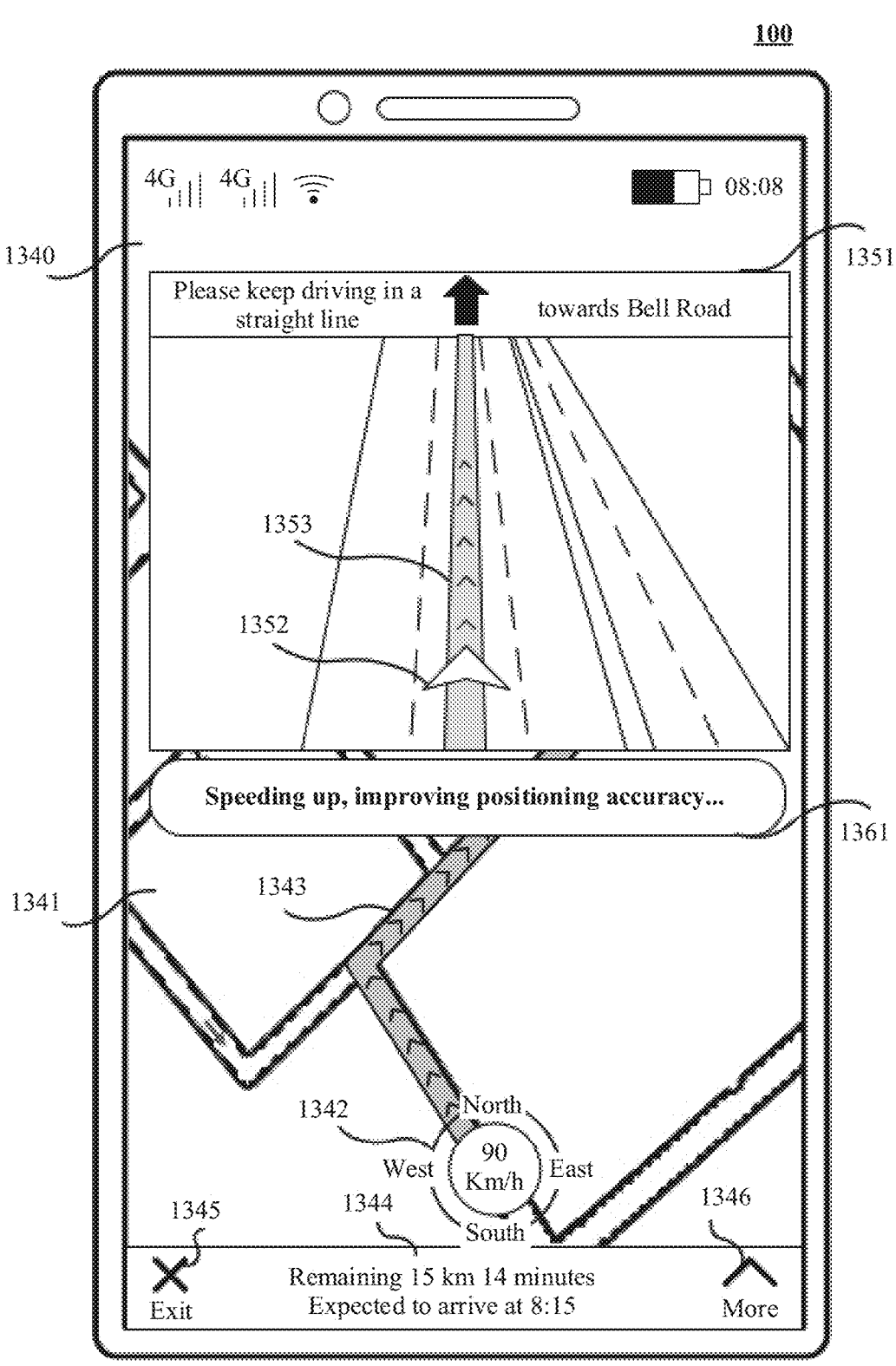

For example, as shown in FIG. 13F, the electronic device 100 is in the normal mode, and receives, at the first time interval, the positioning assistance data broadcast by the server 200. When the electronic device 100 detects that the moving speed of the electronic device 100 is 90 km/h, which is greater than a preset speed threshold (for example, 80 km/h), the electronic device 100 may send the first setting information to the server 200, switch to the extreme performance mode, and display prompt information 1361. The prompt information 1361 may be a text prompt (for example, "a vehicle speed is accelerated, and positioning precision is being improved"), a picture prompt, an animation prompt, or the like.

Figure 13G:
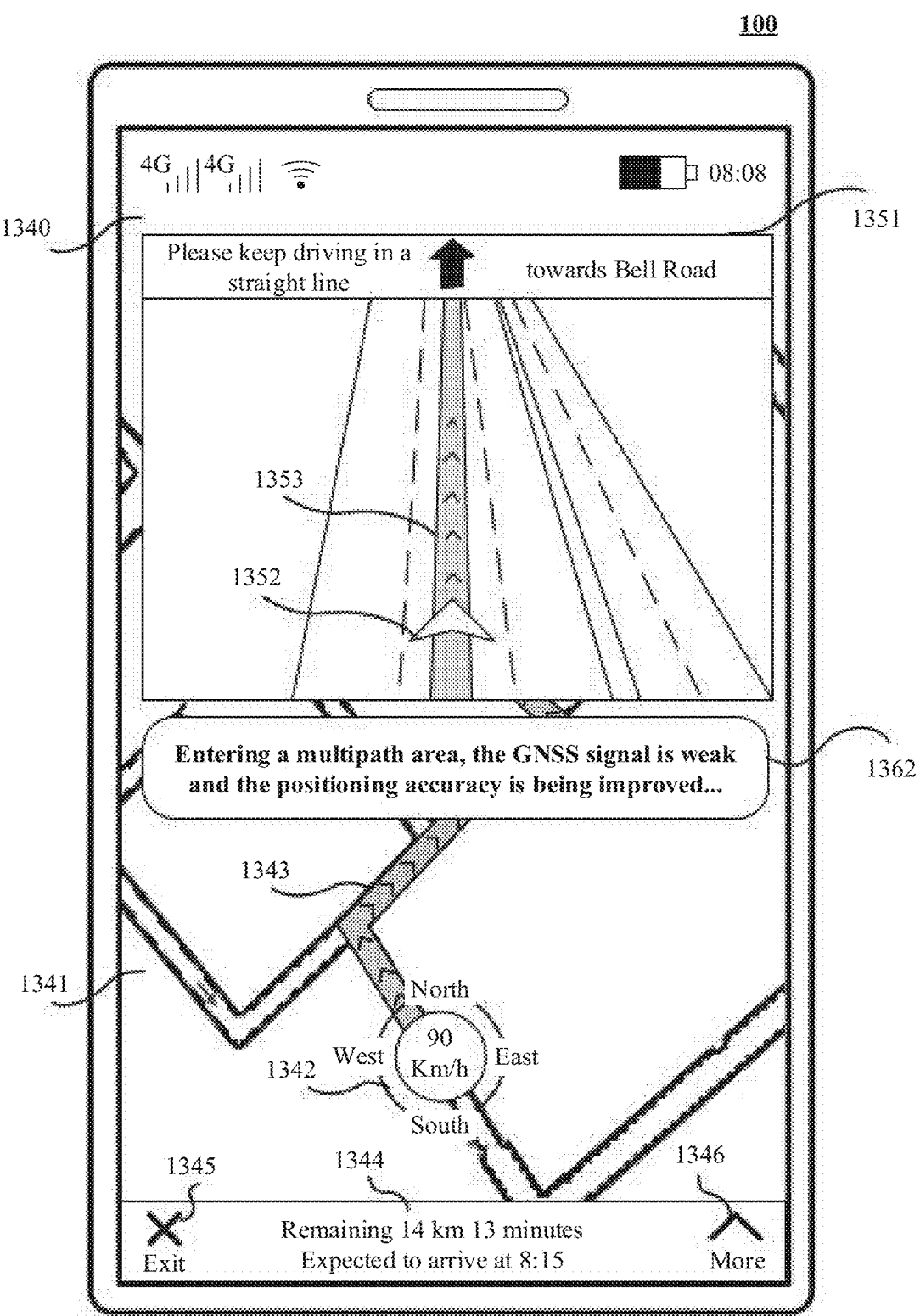

For another example, as shown in FIG. 13G, the electronic device 100 is in the normal mode, and receives, at the first time interval, the positioning assistance data broadcast by the server 200. When the electronic device 100 detects that the electronic device 100 enters a multipath area, the electronic device 100 may send the first setting information to the server 200, switch to the extreme performance mode, and display prompt information 1362. The prompt information 1362 may be a text prompt (for example, "entering a multipath area, a GNSS signal is weak, and positioning precision is being improved"), a picture prompt, an animation prompt, or the like.

Figure 13H:
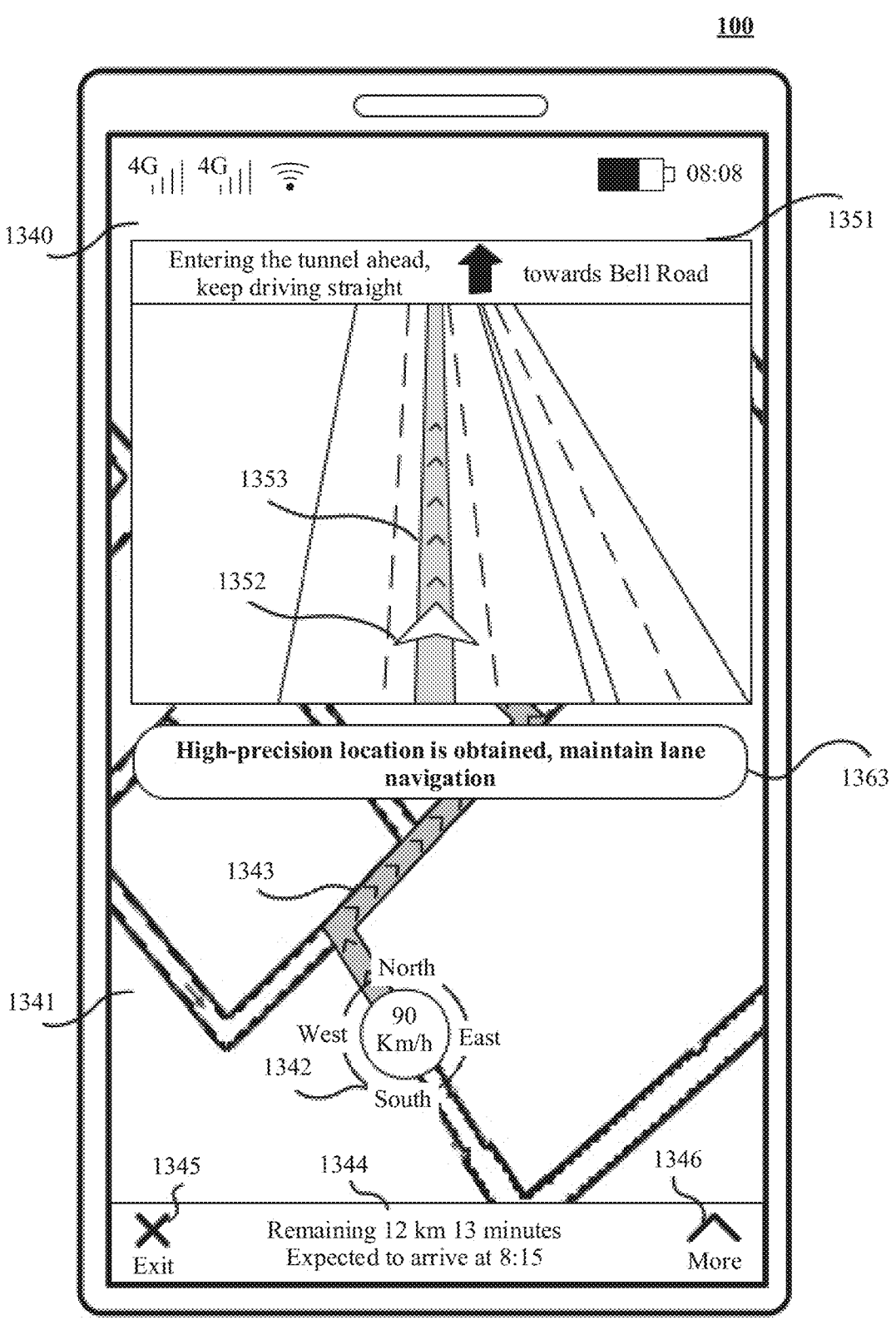

As shown in FIG. 13H, after resolving the high-precision location information based on the positioning assistance data, the GNSS location information, and the measurement information that are broadcast by the server 200 at the first time interval, the electronic device 100 may display prompt information 1363. The prompt information 1363 may be a text prompt (for example, "a high-precision location is obtained, and lane navigation is kept"), a picture prompt, are animation prompt, or the like.

Figure 13I:
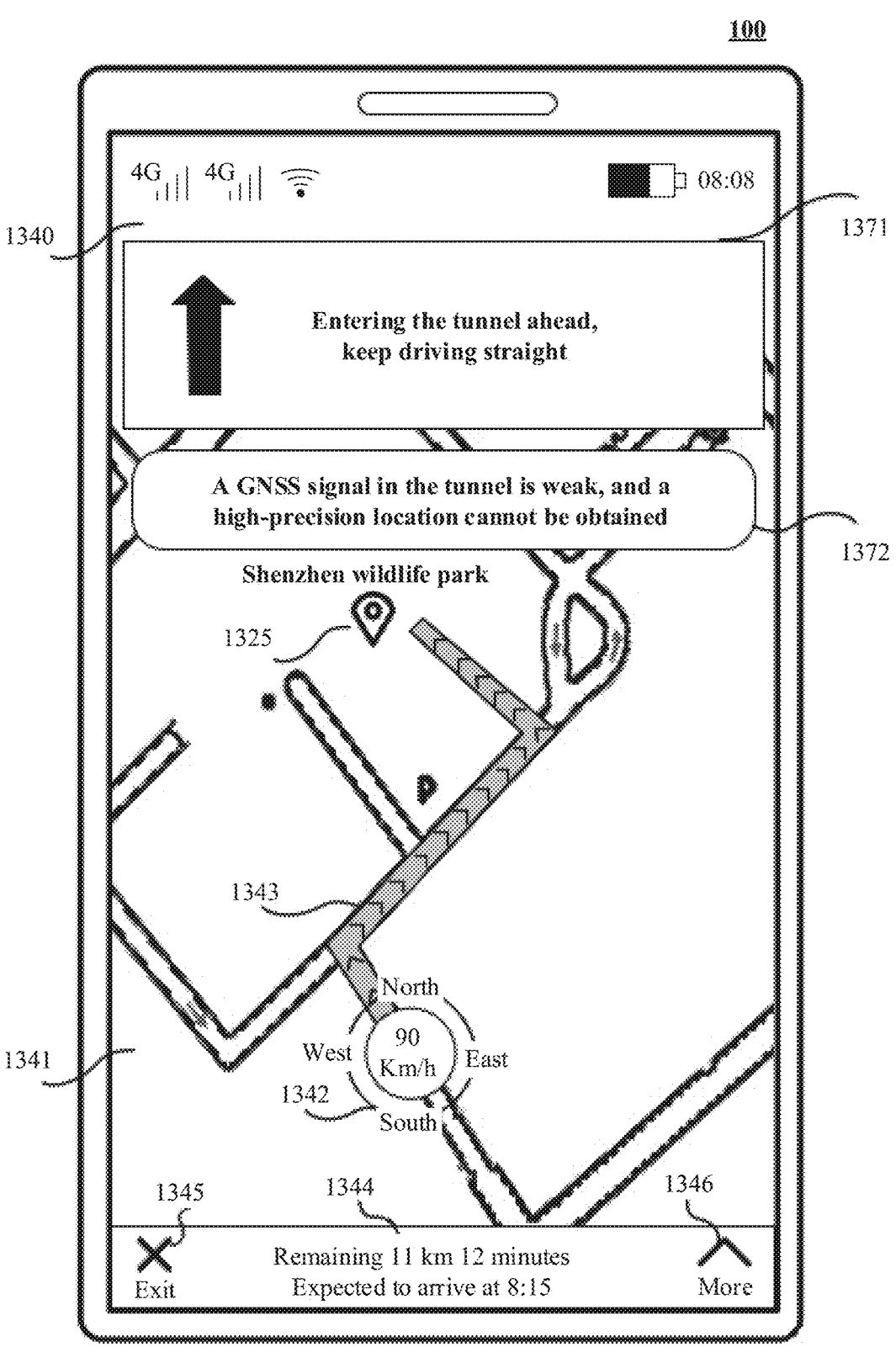

As shown in FIG. 13I, when the electronic device 100 detects that the electronic device 100 enters the tunnel, the electronic device 100 may send third setting information to the server 200, and switch to a suspending mode. The third setting information is used to indicate the server 200 to suspend broadcasting the positioning assistance data. In the suspending mode, the electronic device 100 suspends sending the GNSS location information to the server 200. In the suspending mode, the electronic device 100 may close the navigation prompt box, and display driving information 1371 (for example, "You have entered the tunnel, please keep going straight") and prompt information 1372. The prompt 1372 is used to prompt the user that the electronic device 100 has entered a tunnel. The prompt information 1372 may be a text prompt (for example, "a GNSS signal in the tunnel is weak, and a high-precision location cannot be obtained"), a picture prompt, an animation prompt, or the like.

Figure 13J:
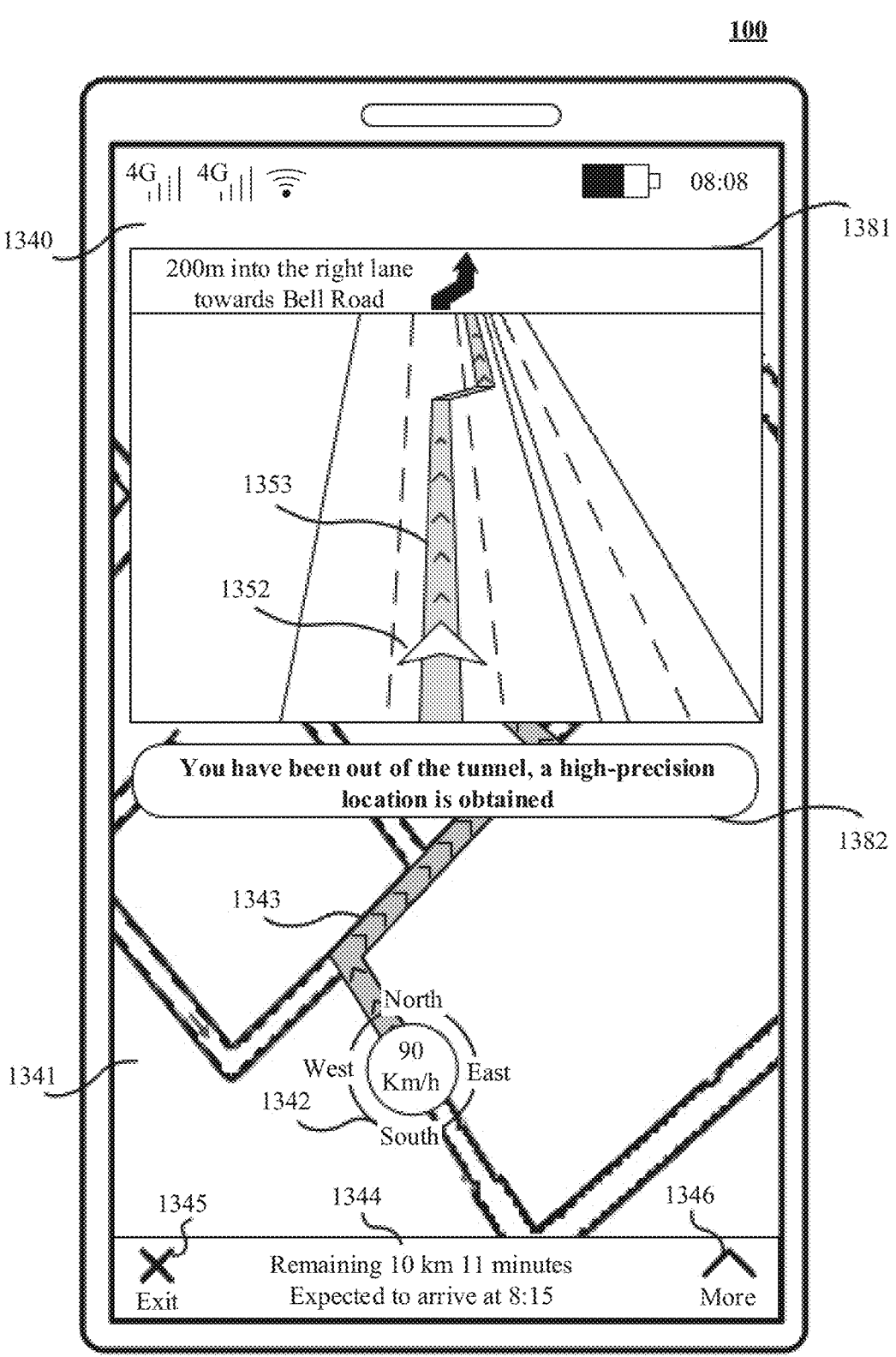

As shown in FIG. 13J, when the electronic device 100 detects that the electronic device 100 exits the tunnel, the electronic device 100 may send the first setting information to the server 200, and switch to the extreme performance mode. The first setting information is used to indicate the server 200 to set the broadcasting interval for broadcasting the positioning assistance data as the first time interval (for example, one second). When detecting that the electronic device 100 leaves the tunnel, the electronic device 100 may further display prompt information 1382. The prompt information 1382 may be used to prompt the user that the electronic device 100 has exited the tunnel. The prompt information 1382 may be a text prompt (,for example, "You have exited the tunnel, and a high-precision location is obtained"), a picture prompt, an animation prompt, or the like.

This embodiment of this application provides a low-power-consumption positioning method, so that a broadcasting policy of positioning assistance data delivered by a server may be dynamically set based on a high-precision positioning status, a scenario in which an electronic device is located, a moving speed of the electronic device, and the like, for example, different broadcasting intervals, enabling or suspending broadcasting. In this way, the electronic device can prolong an interval for requesting the assistance data as much as possible while ensuring high-precision positioning performance, thereby reducing power consumption of the electronic device, In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, comprising:

receiving, by an electronic device, a first input;

sending, by the electronic device, first setting information to a server in response to the first input, wherein the first setting information sets a time interval at which the server broadcasts positioning assistance data as a first time interval;

sending, by the electronic device, first global navigation satellite system (GNSS) location information to the server;

receiving, by the electronic device via broadcast, first positioning assistance data from the server at the first time interval, wherein the first positioning assistance data are based on the first GNSS location information and first measurement data from N reference stations, and wherein N is a positive integer;

resolving, by the electronic device, first high-precision positioning information based on the first GNSS location information and the first positioning assistance data;

sending, by the electronic device when the electronic device meets a first preset condition, second setting information to the server, wherein the second setting information sets a time interval at which the server broadcasts second positioning assistance data as a second time interval, and wherein the second time interval is longer than the first time interval;

sending, by the electronic device, second GNSS location information to the server;

receiving, by the electronic device via broadcast, second positioning assistance data from the server at the second time interval, wherein the second positioning assistance data are based on the second GNSS location information and second measurement data from the N reference stations; and resolving, by the electronic device, second high-precision positioning information based on the second GNSS location information and the second positioning assistance data.

2. The method of claim 1, wherein after sending the second setting information to the server, the method further comprises:

sending, by the electronic device when the electronic device meets a second preset condition, the first setting information to the server;

sending, by the electronic device, third GNSS location information to the server;

receiving, by the electronic device via broadest, third positioning assistance data from the server at the first time interval, wherein the third positioning assistance data are based on the third GNSS location information and third measurement data from the N reference stations; and resolving, by the electronic device, third high-precision positioning information based on the third GNSS location information and the third positioning assistance data.

3. The method of claim 1, wherein after sending the first setting information to the server, the method further comprises sending, by the electronic device when the electronic device meets a third preset condition, third setting information to the server, wherein the third setting information requests the server to suspend broadcasting the second positioning assistance data.

4. The method of claim 3, wherein after sending the third setting information to the server, the method further comprises:

sending, by the electronic device when the electronic device meets a fourth preset condition, the first setting information to the server;

sending, by the electronic device, fourth GNSS location information to the server;

receiving, by the electronic device via broadcast, fourth positioning assistance data from the server at the first time interval, wherein the fourth positioning assistance data are based on the fourth GNSS location information and fourth measurement data from the N reference stations; and resolving, by the electronic device, fourth high-precision positioning information based on the fourth GNSS location information and the fourth positioning assistance data.

5. The method of claim 1, further comprising:

sending, by the electronic device, a high-precision positioning request to the server in response to the first input, wherein the high-precision positioning request comprises authentication information;

receiving, by the electronic device, authentication success information from the server in response to the high-precision positioning request, wherein the authentication success information indicates that the electronic device has completed authentication; and further sending, by the electronic device, the first setting information to the server in response to the authentication success information.

6. The method of claim 1, wherein the first preset condition is a positioning precision of the electronic device being less than a first preset precision threshold, and wherein lower positioning precision indicates more accurate positioning of the electronic device.

7. The method of claim 2, wherein the second preset condition is any one of the following: the electronic device is in a multipath area, a moving speed of the electronic device is greater than a preset speed threshold, or positioning precision of the electronic device is greater than a second preset precision threshold.

8. The method of claim 3, wherein the third preset condition is the electronic device being located indoors or in a tunnel.

9. The method of claim 4, wherein the fourth preset condition is the electronic device being located outdoors or outside a tunnel, and wherein the electronic device is in an area in which the N reference stations are located.

10. The method of claim 8, further comprising determining the electronic device is located indoors or in the tunnel when a quantity of satellites whose signal intensity is greater than a first signal intensity threshold is less than or equal to a first threshold for a preset time.

11. The method of claim 9, further comprising determining the electronic device is located outdoors or outside the tunnel when a quantity of satellites whose signal intensity is greater than a first signal intensity threshold is greater than a second threshold.

12. The method of claim 7, further comprising determining the electronic device is in the multipath area when a quantity of satellites whose signal intensity is greater than a third signal intensity threshold is less than a first quantity and greater than a second quantity, wherein the first quantity is greater than the second quantity.

13. A positioning system, comprising:

an electronic device configured to:

receive a first input;

send first setting information in response to the first input; and send first GNSS location information; and a server configured to:

receive the first setting information and the first GNSS location information from the electronic device;

set, using the first setting information, a time interval at which the server broadcasts positioning assistance data as a first time interval;

determine first positioning assistance data based on the first GNSS location information and first measurement data reported by N reference stations, wherein N is a positive integer; and broadcast the first positioning assistance data to the electronic device at the first time interval, wherein the electronic device is further configured to:

resolve first high-precision positioning information based on the first GNSS location information and the first positioning assistance data;

send, when the electronic device detects that the electronic device meets a first preset condition, second setting information to the server; and send second GNSS location information to the server, wherein the server is further configured to:

set, using the second setting information, a time interval at which the server broadcasts positioning assistance data as a second time interval, wherein the second time interval is longer than the first time interval;

determine second positioning assistance data based on the second GNSS location information and second measurement data reported by the N reference stations; and broadcast the second positioning assistance data to the electronic device at the second time interval, and wherein the electronic device is further configured to resolve second high-precision positioning information based on the second GNSS location information and the second positioning assistance data.

14. The positioning system of claim 13, wherein the electronic device is further configured to:

send, after sending the second setting information to the server and when detecting that the electronic device meets a second preset condition, the first setting information to the server; and send third GNSS location information to the server, wherein the server is further configured to:

determine third positioning assistance data based on the third GNSS location information and third measurement data reported by the N reference stations; and broadcast the third positioning assistance data to the electronic device at the first time interval.

15. The positioning system of claim 13, wherein the electronic device is further configured to send, after sending the first setting information to the server and when the electronic device meets a third preset condition, third setting information to the server, wherein the third setting information requests the server to suspend broadcasting the positioning assistance data, and wherein the server is further configured to suspend broadcasting the first positioning assistance data or the second positioning assistance data to the electronic device in response to the third setting information.

16. The positioning system of claim 15, wherein the electronic device is further configured to:

send, after sending the third setting information to the server and when the electronic device meets a fourth preset condition, the first setting information to the server; and send fourth GNSS location information to the server, wherein the server is further configured to:

determine fourth positioning assistance data based on the fourth GNSS location information and fourth measurement data reported by the N reference stations; and broadcast the fourth GNSS location information to the electronic device at the first time interval, and wherein the electronic device is further configured to resolve fourth high-precision positioning information based on the fourth GNSS location information and the fourth positioning assistance data.

17. The positioning system of claim 13, wherein the electronic device is further configured to:

send a high-precision positioning request to the server in response to the first input, wherein the high-precision positioning request comprises authentication information;

receive authentication success information sent by the server, wherein the authentication success information indicates that the electronic device has completed authentication; and send the first setting information to the server in response to the authentication success information.

18. The positioning system of claim 13, wherein the first preset condition is positioning precision of the electronic device being less than a first preset precision threshold, wherein lower positioning precision indicates more accurate positioning of the electronic device.

19. The positioning system of claim 14, wherein the second preset condition is any one of the following: the electronic device is in a multipath area, a moving speed of the electronic device is greater than a preset speed threshold, or positioning precision of the electronic device is greater than a second preset precision threshold.

20. The positioning system of claim 15, wherein the third preset condition is the electronic device being located indoors or in a tunnel.

* * * * *